(12) United States Patent
Kristem et al.

(10) Patent No.: US 12,015,980 B2
(45) Date of Patent: *Jun. 18, 2024

(54) METHODS AND ARRANGEMENTS TO SUPPORT WAKE-UP RADIO PACKET TRANSMISSION

(71) Applicant: INTEL CORPORATION, Santa Clara, CA (US)

(72) Inventors: Vinod Kristem, San Jose, CA (US); Shahrnaz Azizi, Cupertino, CA (US); Thomas J. Kenney, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/085,156

(22) Filed: Dec. 20, 2022

(65) Prior Publication Data

US 2023/0120176 A1 Apr. 20, 2023

Related U.S. Application Data

(63) Continuation of application No. 16/219,517, filed on Dec. 13, 2018, now Pat. No. 11,589,309.

(Continued)

(51) Int. Cl.
*H04W 52/02* (2009.01)
*H04L 5/00* (2006.01)
(Continued)

(52) U.S. Cl.
CPC ....... *H04W 52/0232* (2013.01); *H04L 5/0092* (2013.01); *H04L 27/2605* (2013.01);
(Continued)

(58) Field of Classification Search
CPC  H04W 52/0232; H04W 80/02; H04L 5/0092; H04L 27/2605; H04L 27/2613;
(Continued)

(56) References Cited

U.S. PATENT DOCUMENTS 7,218,682 B2   5/2007  Mayor
8,472,383 B1*  6/2013  Banerjea .......... H04W 72/0473
                                              370/328

(Continued)

FOREIGN PATENT DOCUMENTS

WO   2019010307 A1   1/2019
WO   2019027159 A1   2/2019

(Continued)

OTHER PUBLICATIONS

Marvel (MUR Legacy Preamble Design) 2017, IEEE 802.11-17/0647r1.

(Continued)

*Primary Examiner* — Michael K Phillips
(74) *Attorney, Agent, or Firm* — KDW Firm PLLC

(57) ABSTRACT

Logic may define one or more wake-up preambles suitable for high data rates for a wake-up radio (WUR) packet. Logic may define wake-up preamble with different counts of symbols. Logic may generate a wake-up preamble as two microsecond pulses of orthogonal frequency-division multiplexing (OFDM) symbols in a four megahertz (MHz) bandwidth. Logic may generate and receive a high data rate (HDR) WUR preamble or a low data rate (LDR) WUR preamble. The HDR preamble may signal a data rate of 250 kilobits per second and the LDR preamble may signal a data rate of 62.5 kilobits per second. The HDR preamble bit count may be twice a bit count of the LDR preamble. The HDR preamble may be 32 bits. The duration of transmission of the HDR may be 64 microseconds and duration of transmission of the LDR may be 128 microseconds.

21 Claims, 11 Drawing Sheets

Related U.S. Application Data

(60) Provisional application No. 62/616,982, filed on Jan. 12, 2018.

(51) Int. Cl.
  *H04L 27/26* (2006.01)
  *H04B 7/0413* (2017.01)
  *H04W 80/02* (2009.01)

(52) U.S. Cl.
  CPC ........ *H04L 27/2613* (2013.01); *H04B 7/0413* (2013.01); *H04L 5/0007* (2013.01); *H04W 80/02* (2013.01)

(58) Field of Classification Search
  CPC ....... H04L 5/0007; H04L 5/00; H04B 7/0413; Y02D 30/70
  See application file for complete search history.

(56) References Cited

U.S. PATENT DOCUMENTS

| | | | |
|---|---|---|---|
| 8,675,482 B1 | 3/2014 | Lu | |
| 9,485,733 B1 | 11/2016 | Park | |
| 9,591,565 B2 | 3/2017 | Park | |
| 9,634,757 B2 | 4/2017 | Huang | |
| 9,749,958 B1 | 8/2017 | Segev | |
| 9,826,482 B2 | 11/2017 | Park | |
| 10,091,728 B2 | 10/2018 | Yang | |
| 10,129,064 B1 | 11/2018 | Lee | |
| 10,321,402 B2 | 6/2019 | Park | |
| 10,341,149 B2 | 7/2019 | Park | |
| 10,362,538 B2 | 7/2019 | Gao | |
| 11,523,306 B1* | 12/2022 | Chu | H04L 69/324 |
| 11,589,309 B2* | 2/2023 | Kristem | H04W 52/0232 |
| 2004/0224728 A1 | 11/2004 | daCosta | |
| 2009/0046682 A1 | 2/2009 | Kim | |
| 2011/0074552 A1 | 3/2011 | Norair | |
| 2014/0185501 A1 | 7/2014 | Park | |
| 2016/0373237 A1 | 12/2016 | Shellhammer | |
| 2017/0094600 A1 | 3/2017 | Min | |
| 2017/0111858 A1 | 4/2017 | Azizi | |
| 2018/0007629 A1 | 1/2018 | Dorrance | |
| 2018/0019902 A1* | 1/2018 | Suh | H04L 27/2607 |
| 2018/0077641 A1 | 3/2018 | Yang | |
| 2018/0084501 A1 | 3/2018 | Mu | |
| 2018/0152333 A1* | 5/2018 | Shellhammer | H04L 27/2697 |
| 2018/0176053 A1 | 6/2018 | Park | |
| 2018/0184377 A1 | 6/2018 | Kenney | |
| 2018/0184378 A1 | 6/2018 | Fang | |
| 2018/0184379 A1 | 6/2018 | Liu | |
| 2018/0192373 A1 | 7/2018 | Fang | |
| 2018/0206193 A1 | 7/2018 | Adachi | |
| 2018/0242249 A1 | 8/2018 | Yang | |
| 2018/0279224 A1 | 9/2018 | Yang | |
| 2018/0288703 A1 | 10/2018 | Sun | |
| 2018/0302901 A1 | 10/2018 | Suh | |
| 2018/0343614 A1 | 11/2018 | Cao | |
| 2018/0376370 A1 | 12/2018 | Shellhammer | |
| 2019/0007904 A1 | 1/2019 | Asterjadhi | |
| 2019/0045445 A1* | 2/2019 | Huang | H04W 52/0229 |
| 2019/0069231 A1 | 2/2019 | Kneckt | |
| 2019/0082385 A1 | 3/2019 | Shellhammer | |
| 2019/0082390 A1 | 3/2019 | Azizi | |
| 2019/0124596 A1 | 4/2019 | Cao | |
| 2019/0208470 A1 | 7/2019 | Asterjadhi | |
| 2019/0246356 A1 | 8/2019 | Kim | |
| 2019/0260624 A1 | 8/2019 | Park | |
| 2019/0268192 A1 | 8/2019 | Lim | |
| 2019/0281549 A1 | 9/2019 | Gan | |
| 2019/0289549 A1 | 9/2019 | Lim | |
| 2019/0394726 A1 | 12/2019 | Gan | |
| 2020/0029276 A1 | 1/2020 | Kim | |
| 2020/0037251 A1 | 1/2020 | Du | |
| 2020/0045635 A1 | 2/2020 | Lin | |
| 2020/0053648 A1 | 2/2020 | Guo | |
| 2020/0059342 A1* | 2/2020 | Sahin | H04L 5/0048 |
| 2020/0092811 A1 | 3/2020 | Park et al. | |
| 2020/0099556 A1* | 3/2020 | Lim | H04L 5/0053 |
| 2020/0178178 A1 | 6/2020 | Huang | |
| 2020/0245137 A1 | 7/2020 | Chitrakar | |
| 2020/0275373 A1 | 8/2020 | Hwang et al. | |
| 2020/0288396 A1 | 9/2020 | Park | |
| 2020/0322889 A1 | 10/2020 | Chitrakar | |
| 2020/0359320 A1 | 11/2020 | Chun | |
| 2020/0367181 A1* | 11/2020 | Lim | H04L 27/26136 |
| 2021/0185612 A1* | 6/2021 | Song | H04W 52/0235 |
| 2021/0227471 A1 | 7/2021 | Chitrakar | |
| 2021/0258877 A1 | 8/2021 | Chitrakar et al. | |
| 2022/0141770 A1 | 5/2022 | Ahn et al. | |

FOREIGN PATENT DOCUMENTS

| | | |
|---|---|---|
| WO | 2019049576 A1 | 3/2019 |
| WO | 2019093811 A1 | 5/2019 |

OTHER PUBLICATIONS

Marvel (MUR preamble SYNC Field Design, 2017, IEEE 802.11-17/0983r0).

Abedi et al. "MAC and Security Baseline Proposal—Normative Text", IEEE P802.15 Working Group for Wireless Personal Area Networks (WPANs), Mar. 16, 2010, 127 pages.

\* cited by examiner

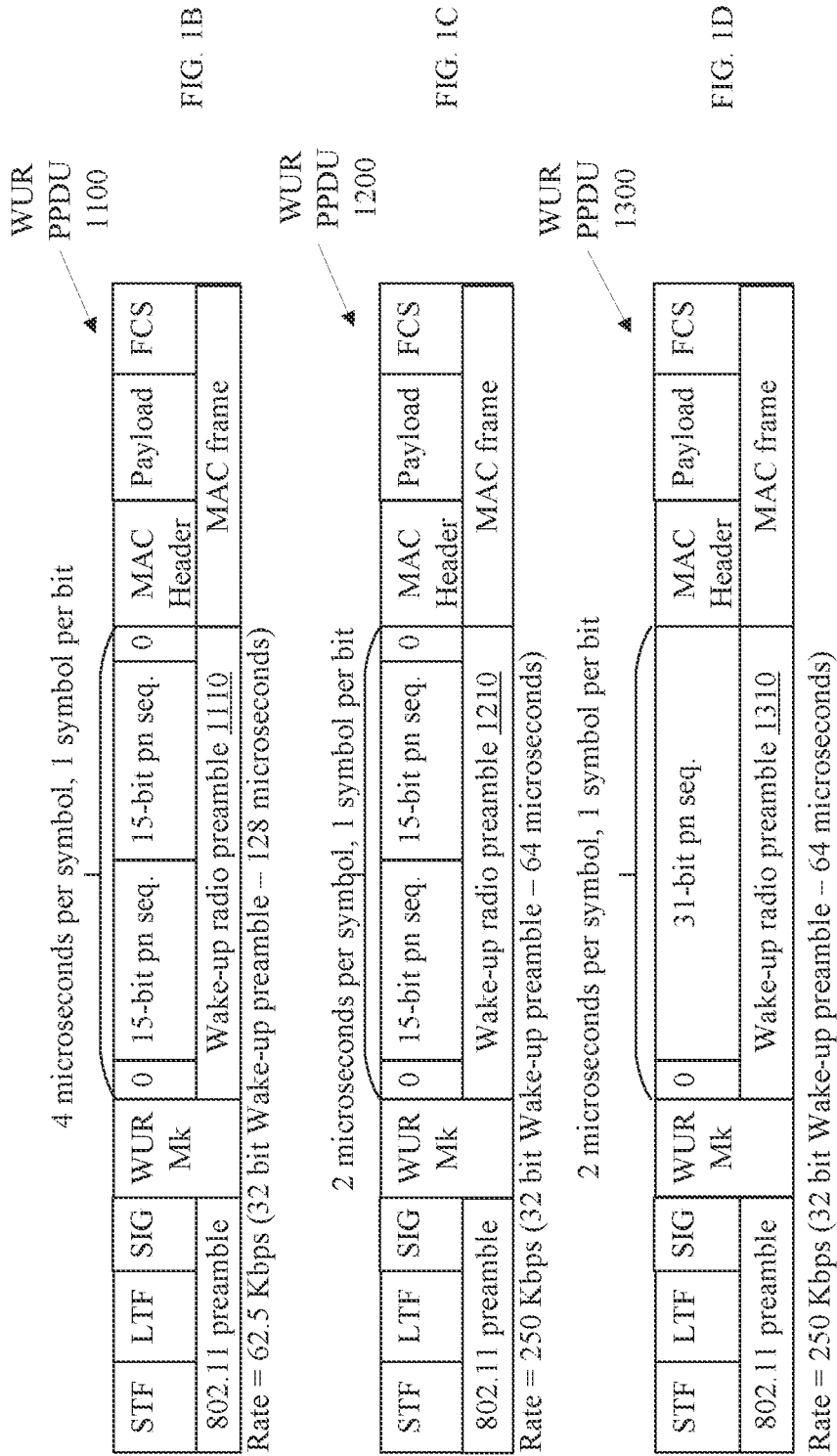

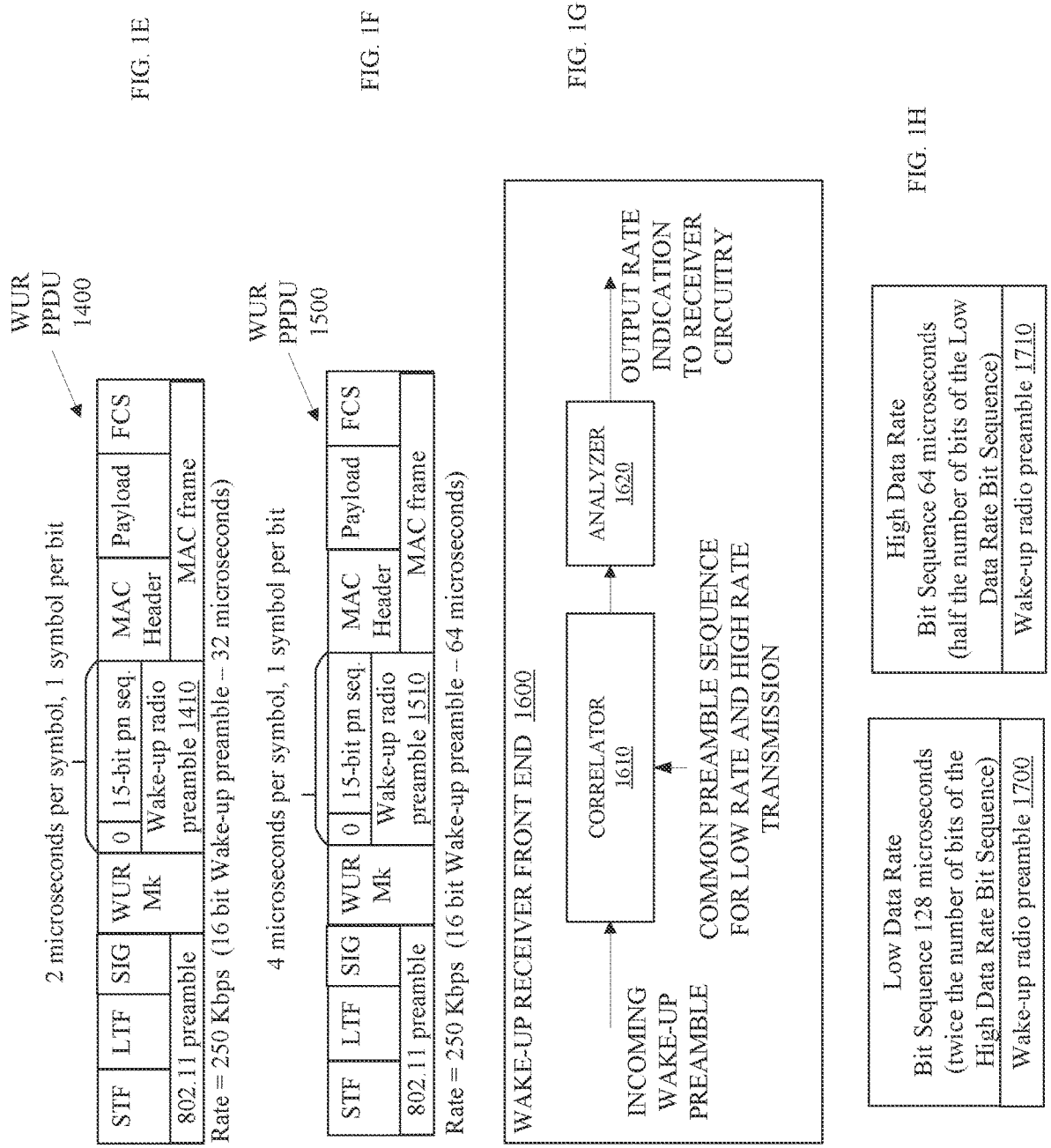

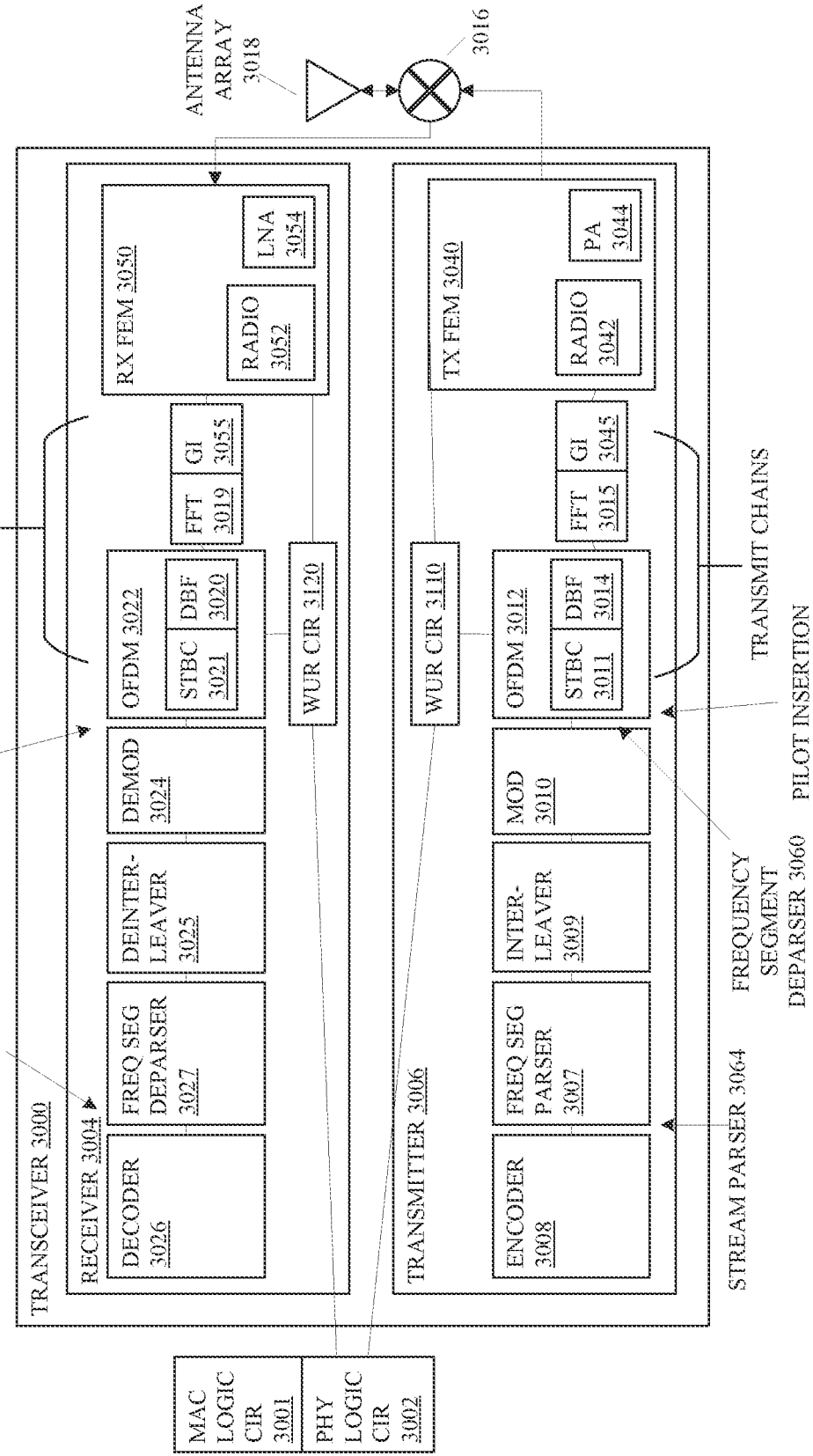

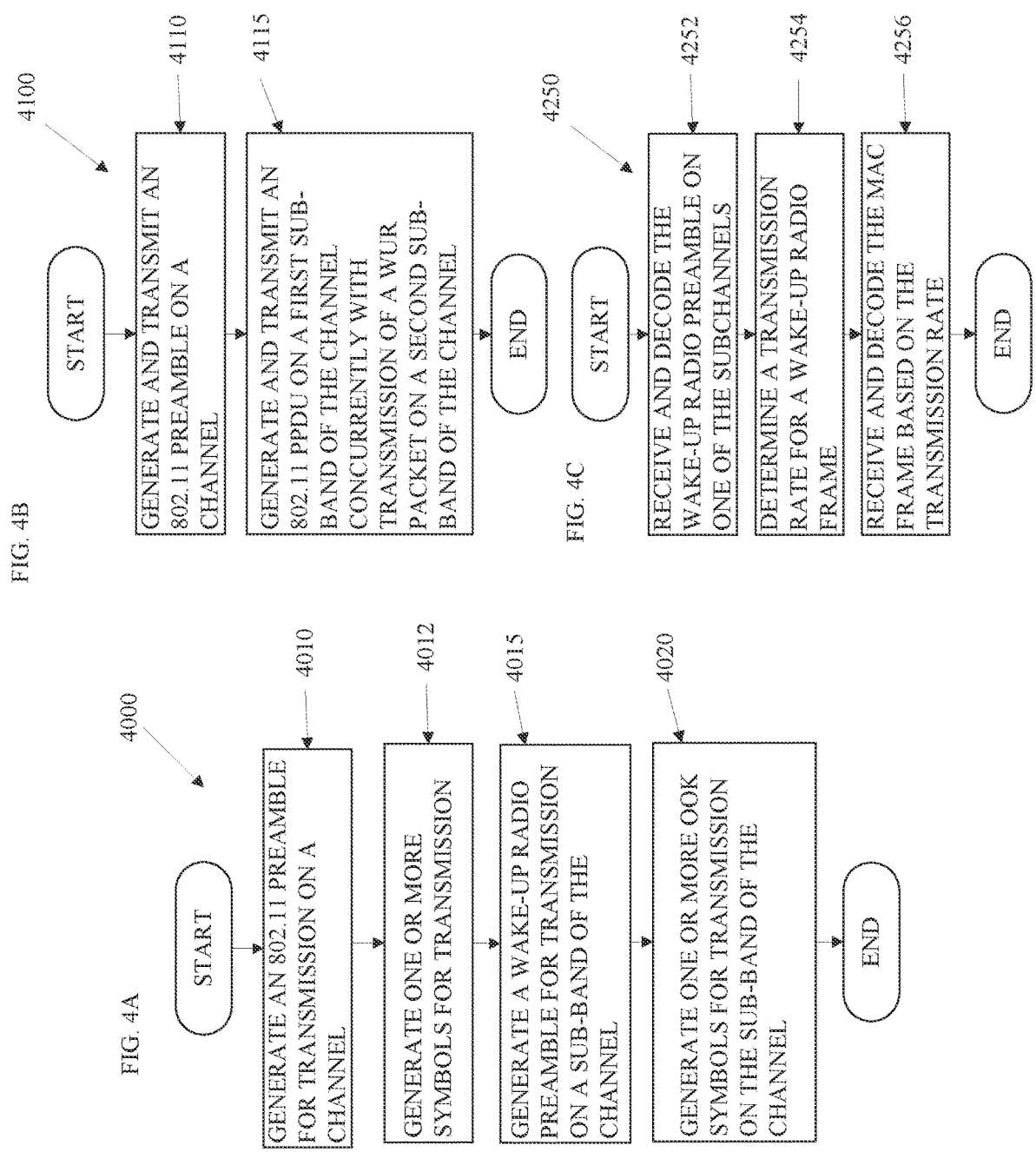

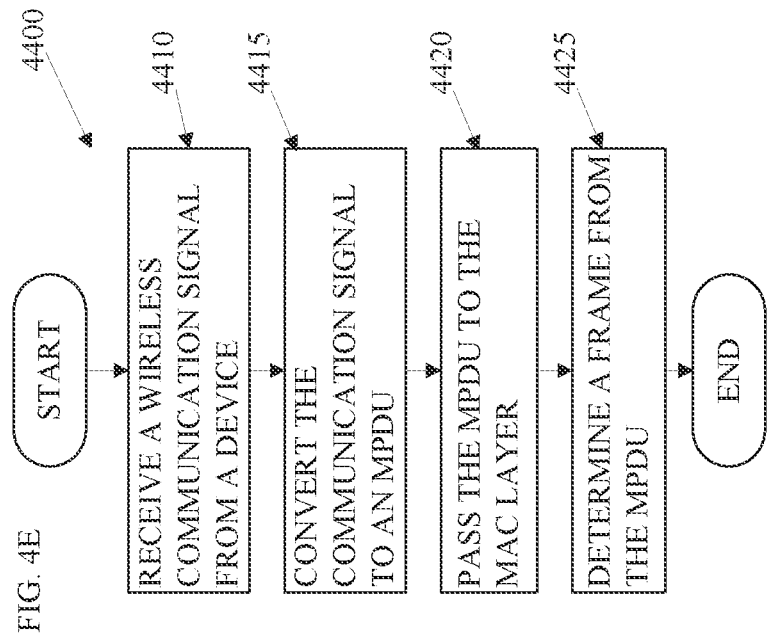
FIG. 4E
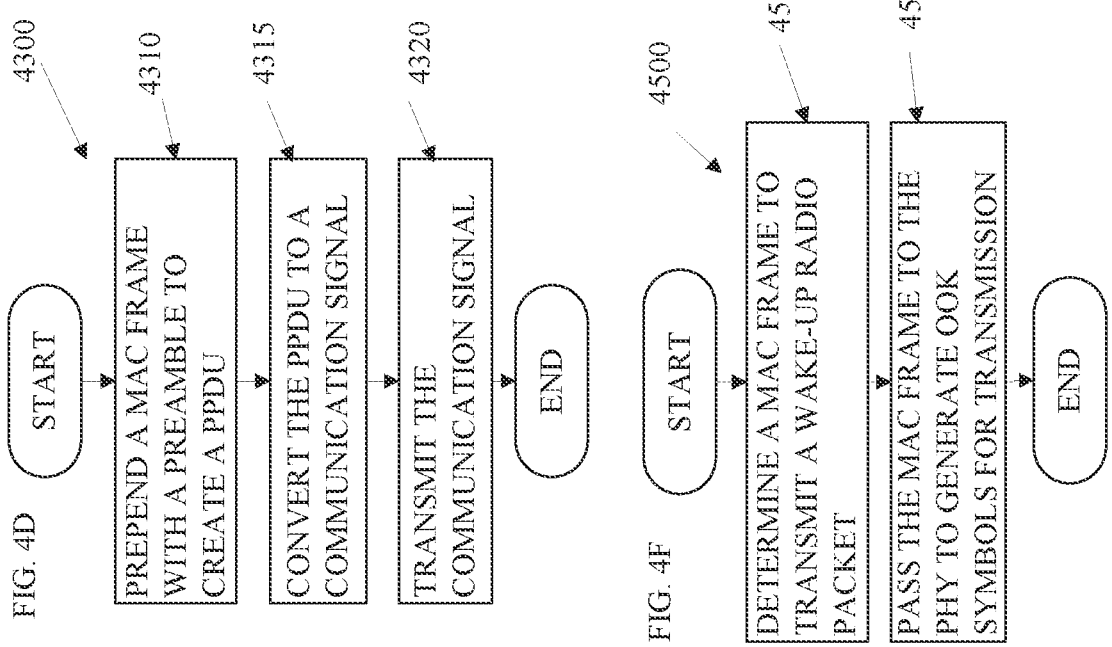
FIG. 4D
FIG. 4F

METHODS AND ARRANGEMENTS TO SUPPORT WAKE-UP RADIO PACKET TRANSMISSION

CROSS REFERENCE TO RELATED APPLICATIONS

This application is a continuation claiming the benefit of and priority to U.S. patent application Ser. No. 16/219,517, entitled "METHODS AND ARRANGEMENTS TO SUPPORT WAKE-UP RADIO PACKET TRANSMISSION" filed Dec. 13, 2018, which claims priority under 35 USC § 119 from U.S. Provisional Application No. 62/616,982, entitled "WAKEUP RADIO PREAMBLE DESIGN AND PULSE GENERATION FOR HIGHER RATE DATA TRANSMISSIONS", filed on Jan. 12, 2018, the subject matters of which are incorporated herein by reference in their entireties.

TECHNICAL FIELD

Embodiments are in the field of wireless communications. More particularly, embodiments may support wakeup radio preamble design and pulse generation for low and high transmission rates for wake-up radio packet transmissions.

BACKGROUND

The increase in interest in network and Internet connectivity and Internet of Things (IoT) drives design and production of new wireless products. Low power consumption is a design factor to facilitate greater usage of wireless devices such as mobile devices and wearable devices. Wireless communication interfaces can consume significant amounts of power, so product designs strike a balance between connectivity and power consumption. Thus, a design goal is to lower the power consumption by the wireless communication interfaces to facilitate increased connectivity in terms of distance, speed, and duration of wireless communications.

BRIEF DESCRIPTION OF THE DRAWINGS

FIG. 1B-F depicts an embodiment of a wake-up preamble to support a low transmission rate for wake-up radio packet transmission and wake-up preambles to support a high transmission rate for wake-up radio packet transmission;

FIG. 1G depicts an embodiment of wake-up receiver (WURx) front end of WUR circuitry, such as the WUR circuitry illustrated in FIG. 1A, that includes a correlator and an analyzer to detect a data rate for a data portion of a WUR packet;

FIG. 1H depicts an embodiment of preambles for high data rate (HDR) and low data rate (LDR);

FIG. 3 depicts an embodiment of an apparatus to support compatible low rate for wake-up radio packet transmission;

FIGS. 4A-C depict embodiments of flowcharts to generate and transmit a wake-up radio frame, to generate and transmit a wake-up radio frame concurrently with another physical layer protocol data unit, and to receive and decode a wake-up radio frame.

FIGS. 4D-E depict embodiments of flowcharts to generate and transmit frames and receive and interpret frames for communications between wireless communication devices; and FIG. 4F depicts an embodiment of a flowchart to generate and pass a medium access control (MAC) frame for transmission in a wake-up radio frame;

DETAILED DESCRIPTION OF EMBODIMENTS

Figure 1A:
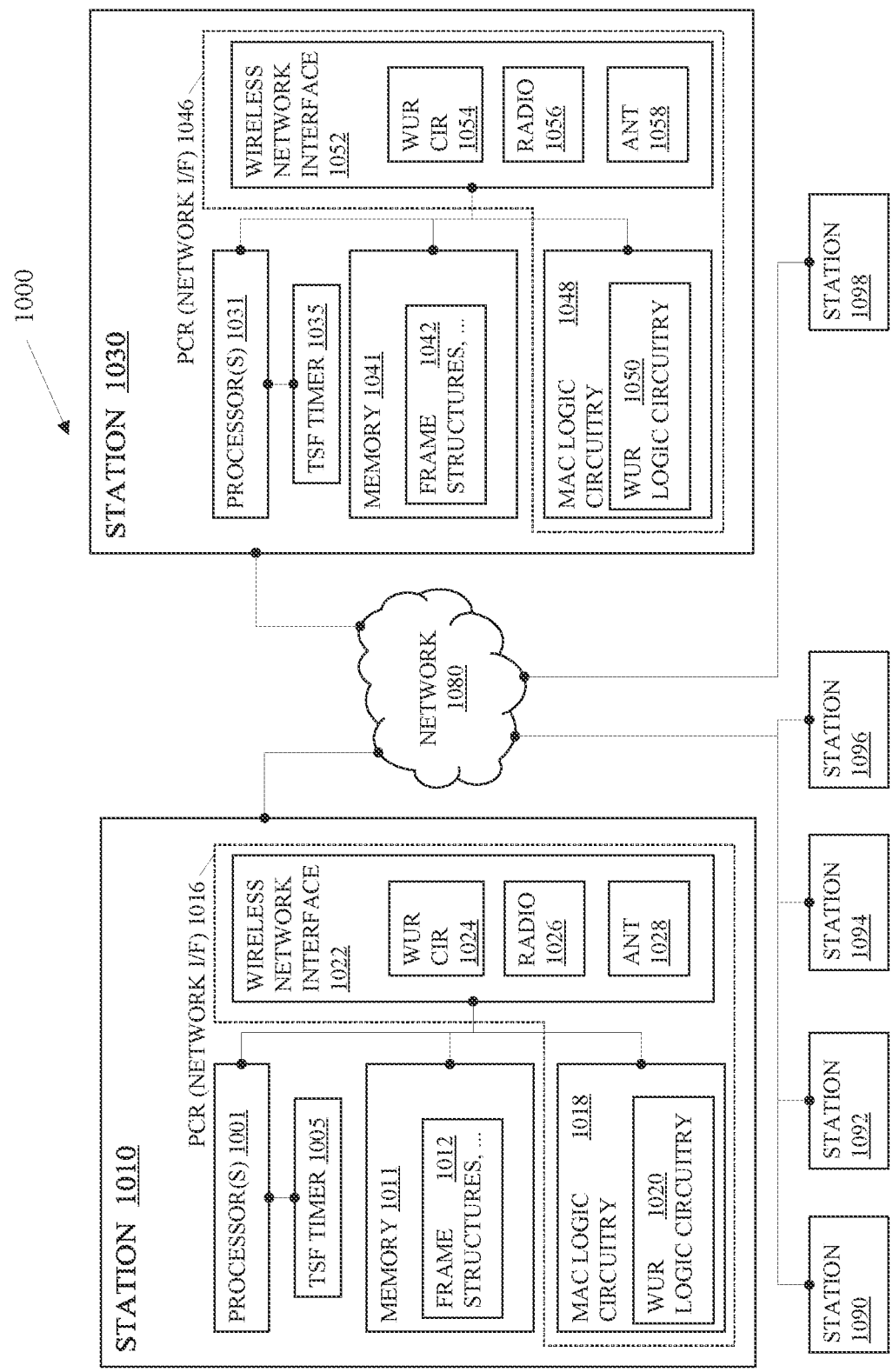
FIG. 1A depicts an embodiment of a wireless network to support wakeup radio preamble design and pulse generation for low and high transmission rates for wake-up radio packet transmissions.

The following is a detailed description of embodiments depicted in the drawings. The detailed description covers all modifications, equivalents, and alternatives falling within the appended claims.

Embodiments may reduce power consumption in wireless communication interfaces by using a low-power wake-up receiver (LP-WURx or WURx) in conjunction with a main Wi-Fi radio, referred to as a primary connectivity radio (PCR) or a main connectivity radio (MCR) in a station. The WURx remains active in a wake-up radio (WUR) mode while the PCR enters a power save state or sleep state to reduce power consumption. When communication with the PCR is requested or needed, a station such as a peer station or an access point (AP) may transmit a WUR physical layer protocol data unit (PPDU) with a wake-up packet (WUP) to instruct the WURx to wake the PCR.

An additional use case has been introduced which allows for a vendor specific mode of operation. The vendor specific mode of operation may have the WUR perform very low power operations or low power operations, such as channel scanning, to off load work from the PCR.

Generally, the transmitter will have a wake-up radio with both transmitting and receiving operation. At the receiver side, only the receiving operation will be implemented, and due to this reason, it is called a wake-up receiver (WURx) at the receiver side.

Some embodiments may transmit the WUP signal with pulses of orthogonal frequency division multiplexing (OFDM) symbols such as an amplitude-shift keying (ASK) modulation to achieve a low cost, low power solution. One example of ASK modulation is On-Off Keying (OOK). The use of OOK modulation may significantly simplifies the hardware involved with the WUR and increases the sensitivity of the wireless communications interface (aka wireless network interface). Furthermore, many embodiments utilize current physical layer (PHY) configurations by implementing the OOK signal with OFDM symbols.

Embodiments may facilitate transmission of the WUR frame (aka WUR packet) in an Institute of Electrical and Electronics Engineers (IEEE) 802.11 multi-user, orthogonal frequency-division multiple access (OFDMA) packet format referred to as a WUR PPDU such as an IEEE 802.11ax OFDMA packet format. The WUR PPDUs may have, e.g., a 20 megahertz (MHz) bandwidth.

In some embodiments, the WUR may transmit a WUR frame after the WUR PPDU preamble with a 4 megahertz (MHz) bandwidth without transmitting packets in other sub-bands of the channel. In further embodiments, the WUR may transmit one or more WUR frames after the WUR PPDU preamble with 4 megahertz (MHz) bandwidths along with packets in other formats such as 802.11ax packets in other sub-bands of the channel with a 2 MHz or greater bandwidth, via orthogonal frequency division multiple access (OFDMA).

In several embodiments, the WUR may transmit WUR frames at transmission rates such as 62.5 kilobits per second (kbps) and/or 250 kbps, within a multi-user, OFDMA packet or as a standalone packet. An example is a physical layer (PHY) device that generates signals to transmit the WUR frame at the center of the band in a multi-user OFDMA transmission that multiplexes IEEE 802.11 transmissions in frequency within the same multi-user OFDMA packet. In other words, the PHY generates signals to transmit multiple different packets on different resource units (RUs) or frequency sub-bands within the channel simultaneously. In other embodiments, the PHY device may generate signals to transmit the WUR frame at a sub-band that is not at the center of the band of the communication channel.

WUR preamble sequences may have total durations of 64 microseconds (us), 128 us, and 256 us (with bit durations or pulses of 2 us or 4 us). Regarding the 2 us WUR pulse generation, one such pulse shape is generated first by an orthogonal frequency-division multiplexing (OFDM) based 4 MHz WUR pulse (64 FFT in 20 MHz bandwidth, with subcarrier spacing of 312.5 kilohertz (KHz)). This pulse may be 4 us long. In some embodiments, a WUR pulse may be a 2 us pulse generated from the 4 us pulse by masking either the first or second half of the time domain pulse. A WUR preamble duration of more than 64 us may not be desirable for high rate applications. One embodiment includes a 64 us preamble sequence with bit duration of 4 us, which is a 16 bit sequence. Another embodiment generates a 2 us pulse by applying a time-domain mask to the 4 us OFDM based WUR pulse.

In one embodiment, the WUR may use of 32-bit sequence using a bit duration of 2 us. This higher length sequence can potentially have a smaller side lobe levels than the 16-bit sequence and hence better detection capability in presence of interference and noise. In one embodiment, the WUR may generate other preamble sequence structures suitable for high data rate applications. In one embodiment, the WUR may generate the 2 us pulse, occupying the 4 MHz bandwidth via another technique. In one embodiment, the WUR may provide the inverse Fast Fourier Transform (IFFT) coefficients to generate the pulse shapes, that optimize the performance measured in terms of PER and PAPR.

In one embodiment, the WUR may generate a 32-bit preamble or a 16-bit preamble, using a bit duration of 2 us (overall preamble duration of 64 us or 32 us). Such preamble sequences are suitable for high rate transmissions. The WUR pulse occupies a bandwidth of 4 MHz and is 2 us long. One such pulse can be generated using OFDM signaling, which allows hardware reuse in the AP or peer station. For instance, the WUR may use a 32 FFT in 20 MHz bandwidth (subcarrier spacing of 625 KHz), and the WUR pulse may occupy 6 subcarriers. This would result in a 2 us long pulse occupying 4 MHz bandwidth. Since the subcarrier spacing of WUR pulse is a multiple of the subcarrier spacing of other 802.11ax radios, this helps in mitigating the interference caused by the WUR radio.

Examples of OFDM symbols for the 2-microsecond pulse are $\{1,0,1,0,1,0,0,0,-1,0,1,0,-1\}$ and $\{1,0,1,0,-1,0,0,0,-1,0,-1,0,1\}$. Examples of OFDM symbols for the 4-microsecond pulse are $\{1,1,1,-1,-1,-1,0,-1,1,-1,-1,1,-1\}$ and $(1+j)\{1,-1,1,-1,-1,1,0,-1,-1,1,1,1,1\}$.

One embodiment may have only one data rate for transmission of WUR frame to meet the requirements of a WUR with very simple reduced hardware complexity with low cost. Other embodiments may enable two or more data rates for WUR frame transmissions. For instance, embodiments may enable two or more data rates such as (1) a low data rate (LDR), e.g., 62.5 kilobits per second (kbps), to meet the IEEE 802.11b/11ax-extended range mode link budget and range and (2) a higher data rate, such as 250 kbps to have shorter packet transmission times, to match (exceed) the link budget of repetition rates in previous Wi-Fi standards. Some embodiments may comprise two different packet and/or preamble formats for WUR frames for use as a signaling method for the data transmission rate of the WUR frame.

In several embodiments, the WUR may signal the LDR or the HDR based on selection of the WUR preamble. For instance, the WUR may signal the LDR with a first preamble and the HDR with the second preamble to avoid the overhead associated with signaling via signal field bits. In other words, a WURx may be capable of identifying and, in some embodiments, distinguishing at least two different WUR preambles, the first WUR preamble to signal the LDR and the second WUR preamble to signal the HDR.

In some embodiments, a WUR preamble to signal the LDR may have a different number of symbols or bits than the WUR preamble to signal the HDR. In further embodiments, the WUR preamble to signal the LDR may transmit with a different duration than the WUR preamble to signal the HDR. For example, the WUR preamble to signal the LDR may have a duration that is twice the duration of the WUR preamble to signal the HDR and may also have twice the number of bits or symbols as the WUR preamble to signal the HDR. In further embodiments, the duration of the WUR preamble to signal the LDR is 128 microseconds.

As a further example, the WUR preamble to signal the HDR may have a duration that is half the duration of the WUR preamble to signal the LDR and may also have half the number of bits or symbols as the WUR preamble to signal the LDR. In further embodiments, the duration of the duration of the WUR preamble to signal the HDR is 64 microseconds. In one embodiment, the WUR may transmit a 32-bit WUR preamble to signal the HDR. In several embodiments, one bit is one symbol but other embodiments may differ.

Some embodiments are particularly directed to improvements for wireless local area network (WLAN), such as a WLAN implementing one or more Institute of Electrical and Electronics Engineers (IEEE) 802.11 standards (sometimes collectively referred to as "Wi-Fi"). Such standards may include, for instance, the IEEE 802.11-2016, published Mar. 29, 2012, and the IEEE 802.11ax/D1.4, published August 2017. The embodiments are not limited to these standards.

To achieve the target of very low power consumption WUR, embodiments implement waveforms and techniques that allow extremely simple and low cost, low power hardware solutions. This is departure from previous versions of the Wi-Fi standard. One embodiment includes hardware that uses an inexpensive, very low power radio frequency (RF) section with a minimal baseband solution. Some embodiments include a PCR and a WURx and no corresponding WUR transmitter. Some embodiments include a PCR and a WUR transmitter and no corresponding WURx. Some embodiments include a PCR and both a WUR transmitter and a corresponding WURx. Other embodiments implement techniques that are more complicated requiring more hardware/cost and power. Different embodiments may provide preferable performance in different deployments or in different scenarios at various price points and power consumption levels.

Various embodiments may be designed to address different technical problems associated with generating and encoding and receiving and decoding a wake-up radio packet; generating and transmitting a wake-up radio packet using a pulse of an OFDM symbol; generating and transmitting a wake-up radio packet using a 4 microsecond pulse of an OFDM symbol; generating and transmitting a wake-up radio packet using a 2 microsecond pulse of an OFDM symbol; generating and transmitting a wake-up radio packet with a 4 MHz bandwidth; identifying a data rate for a wake-up radio packet; generating and transmitting signaling to identify a data rate for a MAC frame in a wake-up radio packet without impacting the size or duration of the wake-up radio packet; and/or the like.

Different technical problems such as those discussed above may be addressed by one or more different embodiments. Embodiments may address one or more of these problems associated with generation and transmission receipt and interpretation of a wake-up radio packet. For instance, some embodiments that address problems associated with generation and transmission, receipt, decoding, and interpretation of a wake-up radio packet may do so by one or more different technical means, such as, generating or decoding, by logic circuitry, the WUR packet with a 4 megahertz (MHz) bandwidth, wherein the WUR packet comprises a high data rate (HDR) preamble followed by a medium access control (MAC) frame, the HDR preamble to indicate a rate of transmission of the MAC frame, the HDR preamble comprising 32 bits to transmit using 2 microsecond pulses of orthogonal frequency-division multiplexing (OFDM) symbols to signal a data rate of 250 kilobits per second; cause transmission of the WUR packet; the HDR preamble to transmit with a duration of 64 microseconds; the logic circuitry to generate a second WUR packet with a 4 megahertz (MHz) bandwidth, wherein the second WUR packet comprises a low data rate (LDR) preamble followed by a second MAC frame; the LDR preamble to transmit using 2 microsecond pulses of orthogonal frequency-division multiplexing (OFDM) symbols to signal a rate of transmission of the second MAC frame of 62.5 kilobits per second; the LDR preamble comprising a bit count that is twice a bit count of the HDR preamble; the LDR preamble to transmit with a duration of 128 microseconds; the logic circuitry, after transmission of the LDR preamble, to send the second MAC frame using 4 microsecond pulses of OFDM symbols; the logic circuitry to transmit using a 2 microsecond pulse by masking half of a time domain signal of a 4 microsecond pulse of an OFDM symbol; and/or the like.

Several embodiments comprise central servers, access points (APs), and/or stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, and the like), and the like. Some embodiments may provide, e.g., indoor and/or outdoor "smart" grid and sensor services. In various embodiments, these devices relate to specific applications such as healthcare, home, commercial office and retail, security, and industrial automation and monitoring applications, as well as vehicle applications (automobiles, self-driving vehicles, airplanes, and the like), and the like.

Embodiments may facilitate wireless communications in accordance with multiple standards. Some embodiments may comprise low power wireless communications like Bluetooth®, cellular communications, and messaging systems. Furthermore, some wireless embodiments may incorporate a single antenna while other embodiments may employ multiple antennas or antenna elements.

While some of the specific embodiments described below will reference the embodiments with specific configurations, those of skill in the art will realize that embodiments of the present disclosure may advantageously be implemented with other configurations with similar issues or problems.

Turning now to FIG. 1A, there is shown an embodiment of a system 1000 to transmit or receive a WUR packet as well as to generate, transmit, receive, decode, and interpret simultaneous transmissions between an access point (AP) and multiple stations (STAs) associated with the AP. The plurality of communications devices comprises STAs 1010 and 1030, and STAs 1090, 1092, 1094, 1096, and 1098. The STA 1010 may be wired and wirelessly connected to each of the STAs 1030, 1090, 1092, 1094, 1096, and 1098 and the STA 1010 may comprise an access point (AP) or a peer device.

Figure 5:
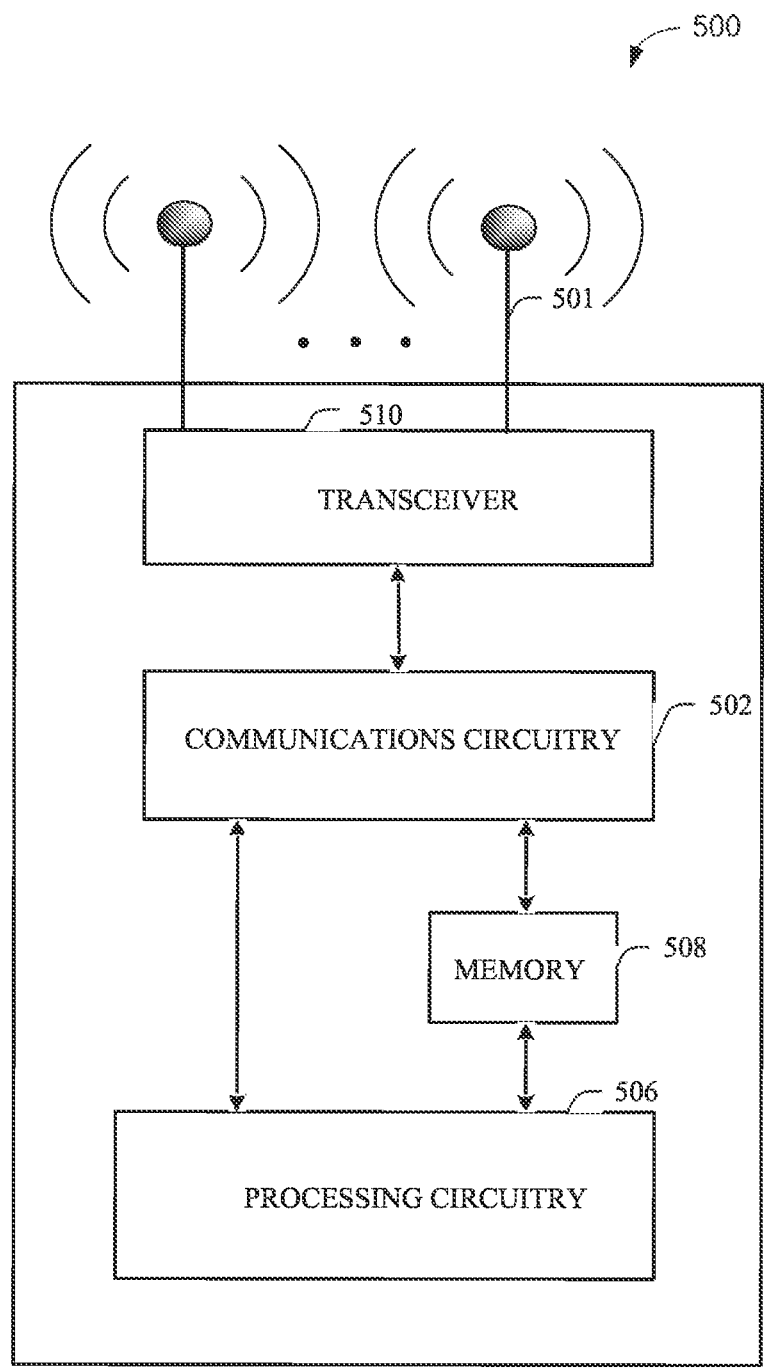
FIG. 5 depicts an embodiment of a functional diagram of a wireless communication device, in accordance with one or more example embodiments of the present disclosure.
Figure 6:
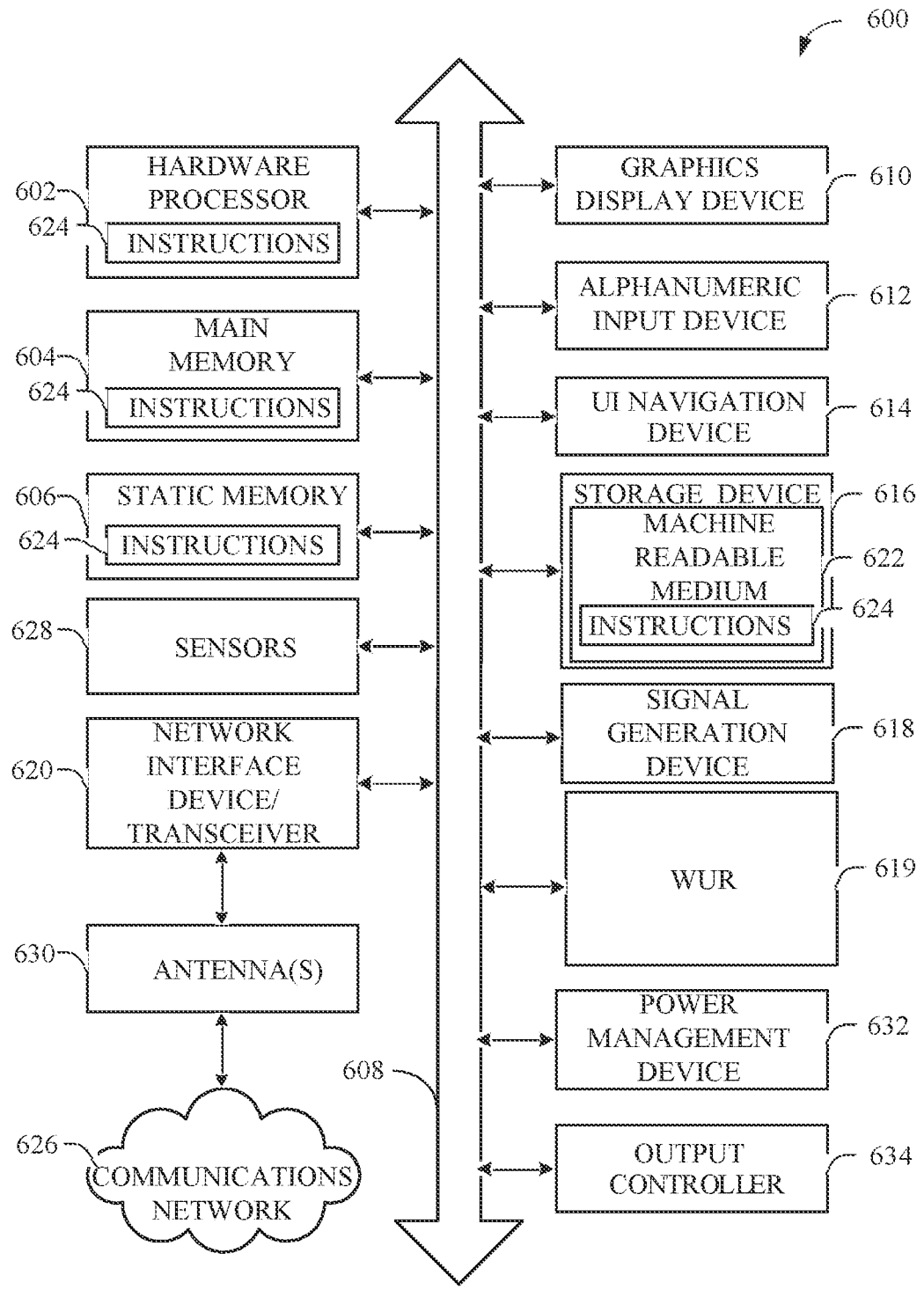
FIG. 6 depicts an embodiment of a block diagram of a machine upon which any of one or more techniques (e.g., methods) may be performed, in accordance with one or more embodiments.

In some embodiments, the STAs 1010 and 1030 may include one or more computer systems similar to that of the functional diagram of FIG. 5 and/or the example machine/system of FIG. 6.

Each STA 1030, 1090, 1092, 1094, 1096, and 1098 may associate with the STA 1010. After associating with the STA 1010, each STA 1030, 1090, 1092, 1094, 1096, and 1098 may receive a channel sounding packet for beamforming their respective primary connectivity radios (PCRs) such as the PCR 1046 of the STA 1030. In many embodiments, the channel sounding packet may comprise a physical layer (PHY) null data packet (NDP). For instance, the channel sounding packet may include a very high throughput (VHT) NDP or a high efficiency (HE) NDP. In some embodiments, the medium access control (MAC) logic circuitry may control the timing of transmission of the channel sounding packet.

It should be noted that any addressable unit may be an STA. An STA may take on multiple distinct characteristics, each of which shape its function. For example, a single addressable unit might simultaneously be a portable STA, a quality-of-service (QoS) STA, a dependent STA, and a hidden STA. The one or more illustrative STAs 1010, 1030, 1090, 1092, 1094, 1096, and/or 1098 may operate as a personal basic service set (PBSS) control point/access point (PCP/AP). The STAs 1010, 1030, 1090, 1092, 1094, 1096, and/or 1098 may include any suitable processor-driven device including, but not limited to, a mobile device or a non-mobile, e.g., a static, device. For example, the STAs 1010, 1030, 1090, 1092, 1094, 1096, and/or 1098 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may be a STA and may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The STAs 1010, 1030, 1090, 1092, 1094, 1096, and/or 1098 may also include mesh stations in, for example, a mesh network, in accordance with one or more IEEE 802.11 standards and/or 3GPP standards.

The STAs, 1030, 1090, 1092, 1094, 1096, and/or 1098 may also communicate peer-to-peer or directly with each other with or without the STA 1010. The communications network 1080 may include, but not limited to, any one or combination of different types of suitable communications networks such as, for example, broadcasting networks, cable networks, public networks (e.g., the Internet), private networks, wireless networks, cellular networks, or any other suitable private and/or public networks. Further, the communications network 1080 may have any suitable communication range associated therewith and may include, for example, global networks (e.g., the Internet), metropolitan area networks (MANs), wide area networks (WANs), local area networks (LANs), or personal area networks (PANs). In addition, the communications network 1080 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of STAs 1010, 1030, 1090, 1092, 1094, 1096, and/or 1098 may include one or more communications antennas. The one or more communications antennas may be any suitable type of antennas corresponding to the communications protocols used by the STAs 1010, 1030, 1090, 1092, 1094, 1096, and/or 1098. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the STAs 1010, 1030, 1090, 1092, 1094, 1096, and/or 1098.

Any of the STAs 1010, 1030, 1090, 1092, 1094, 1096, and/or 1098 may be configured to perform directional transmission and/or directional reception in conjunction with wirelessly communicating in a wireless network. Any of the STAs 1010, 1030, 1090, 1092, 1094, 1096, and/or 1098 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the STAs 1010, 1030, 1090, 1092, 1094, 1096, and/or 1098 may be configured to perform any given directional transmission towards one or more defined transmit sectors. Any of the STAs 1010, 1030, 1090, 1092, 1094, 1096, and/or 1098 may be configured to perform any given directional reception from one or more defined receive sectors.

MIMO beamforming in a wireless network may be accomplished using RF beamforming and/or digital beamforming. In some embodiments, in performing a given MIMO transmission, the STAs 1010, 1030, 1090, 1092, 1094, 1096, and/or 1098 may be configured to use all or a subset of its one or more communications antennas to perform MIMO beamforming.

Any of the STAs 1010, 1030, 1090, 1092, 1094, 1096, and/or 1098 may include any suitable radio and/or transceiver for transmitting and/or receiving radio frequency (RF) signals in the bandwidth and/or channels corresponding to the communications protocols utilized by any of the STAs 1010, 1030, 1090, 1092, 1094, 1096, and/or 1098 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In the present embodiment, the STA 1010 comprises a PCR 1016 and a wake-up radio (WUR) transmitter. The WUR transmitter may comprise WUR logic circuitry 1020 integrated with the MAC logic circuitry 1018 and WUR circuitry 1024 integrated with the wireless network interface (I/F) 1022. The WUR transmitter may comprise a distinct wireless interface that is a distinct piece of hardware from the PCR 1016 of the STA 1010 and possibly may reside in a separate package, or may implement portions of the PCR 1016 as part of the WUR transmitter. In other words, the WUR transmitter reuse or not reuse portions of the PCR 1016 circuitry. In other embodiments, such as embodiments of peer stations that are battery-operated devices, relay devices, or repeater devices; the peer stations such as STA 1010 may comprise both a WUR transmitter and a wake-up receiver (WURx). Such an embodiment is illustrated in FIG. 6.

In the present embodiment, the STA 1030 comprises a PCR 1046 and a WURx. The WURx may comprise WUR logic circuitry 1050 integrated with the MAC logic circuitry 1048 and WUR circuitry 1054 integrated with the wireless network interface (I/F) 1052. The WURx may comprise a distinct wireless interface that is a distinct piece of hardware from the PCR 1046 of the STA 1030 and possibly may reside in a separate package, or may implement portions of the PCR 1046 as part of the WURx. In other embodiments, such as embodiments of stations that are battery-operated devices, the devices such as STA 1030 may comprise both a WUR transmitter and a WURx.

For WUR compatible STAs (also referred to as WUR STAs) such as the STA 1030, the STA 1010 can implement the WUR operation (or functionality). The WUR operation may allow the STA 1030 to enter a WUR mode in which the PCR 1046 of the STA 1030 is in a low power consumption state such as a sleep state or a doze state and in which the PCR 1046 of the STA 1030 is unavailable to receive communications. Advantageously, while the STA 1030 is in the WUR mode, the STA 1010 can wake the PCR 1046 of the STA 1030 by transmitting a WUP to the STA 1030 that is addressed to the WURx of the STA 1030, broadcast to a group of WURx's including the WURx of the STA 1030, or broadcast generally to all STAs. Some embodiments may also or alternatively have a vendor specific mode of operation in which the STAs can receive vendor-specific formats of WUR packets.

The STA 1010 may transmit the WUP as part of a WUR PHY protocol data unit (PPDU). The WUR PPDU may comprise, e.g., a 20 MHz bandwidth packet for transmission on a 20 MHz or greater channel with the WUP on a 4 MHz subchannel of the 20 MHz channel and, possibly, other packets on other resource units (RUs) of the 20 MHz channel. In several embodiments, the STA 1010 may transmit the WUP using 2-microsecond pulses of orthogonal frequency division multiplexing (OFDM) symbols via orthogonal frequency division multiple access (OFDMA). In other embodiments, the WUR waveform could be created using other modulation types like just On-Off Keying using a time domain waveform. The WUP may comprise a minimal PHY packet with a PHY preamble and a medium access control (MAC) frame. The PHY preamble may comprise a WUR preamble that may identify, based on the configuration of the WUR preamble, a data rate for the data portion of the PHY frame, which is the MAC frame.

Many embodiments may transmit a WUR preamble of the WUR packet to synchronize with a WUR of another device. In some embodiments, the preamble structure may signal the rate of transmission, or data rate, for the WUR packet. Such embodiments may define at least one wake-up preamble for each data rate to distinguish the data rates with the preambles.

In other embodiments, when more than one data rate is supported, the data rate needs to be either pre-negotiated or otherwise signaled in the wake-up packet. In one embodiment, the STA 1010 (the AP) may embed the rate information in the preamble portion of the WUR packet. Pre-negotiation of the data rate can be done via the primary connectivity radio (PCR) prior to engaging the WUR and going to power down. However, for a device that is mobile, and may move further away from its associated AP while the PCR is in power-down mode, pre-negotiating a rate for the WUR will be problematic. As an example, if at the time of negotiation the 250 Kbps is selected, meeting the range of operation for WUR, but then the device moves to be at a new location the higher data rate may not meet the link budget to maintain a link with the AP. Therefore, enabling per packet signaling of data rate can be advantageous in some embodiments.

In several embodiments, the WUR transmitter of the STA 1010 may be capable of transmitting at least a first WUR preamble and a second WUR preamble. The first WUR preamble may signal a low data rate (LDR) such as 62.5 kilobits per second (kbps), and the second WUR preamble may signal a high data rate (HDR) such as 250 kbps. In some embodiments, both the preambles for the LDR and the HDR transmit using 2 microsecond pulses of OFDM symbols or 4 microsecond pulses of OFDM symbols. In some embodiments, the first WUR preamble may comprise twice the number of symbols or bits as the second WUR preamble and, in several embodiments, the first WUR preamble may comprise two repetitions of the second preamble.

The WURx of the STA 1030 may receive the WUP and, in response to receipt of the WUP, the STA 1030 may wake the PCR 1046 so the PCR 1046 can communicate with the STA 1010. The WURx of the STA 1030 may be integrated with the PCR 1046 or may comprise distinct circuitry. The PCR 1046 is a main radio for communication by the STA 1030, or at least one of the main radios, that can associate with a basic service set (BSS) via, e.g., an AP such as the STA 1010, or a peer device such as a personal basic service set (PBSS) control point (PCP).

In the WUR mode, the PCR 1046 may enter a sleep mode to save power and the WURx of the STA 1030 can awake the PCR 1046 in response to receipt of a WUP from, e.g., the STA 1010 to perform a scheduled service or an unscheduled service associated with the PCR 1046. For instance, the STA 1010 may manage a BSS and may negotiate a service period with the PCR 1046 to periodically transmit data packets such as Internet protocol (IP) packets to the PCR 1046 every 10 microseconds. The data packets may include the data in a frame body of the data frame. FIG. 2F illustrates an example of a MAC frame, management frame 2400, that can be a data frame, with a frame body 2434 that can include an IP packet.

In the present embodiment, at least part of the WURx of the STA 1030 is a part of the PCR 1046 that remains operational while the PCR 1046 is in the doze state in WUR mode. While the PCR 1046 is in the doze state in WUR mode, the PCR 1046 does not receive the IP packets from the STA 1010 but the STA 1010 may transmit a WUR PPDU with a WUP such as the WUR PPDUs illustrated in FIGS. 2D and 2E, to instruct the WURx of the STA 1030 to wake the PCR 1046 in STA 1030. Upon waking, the PCR 1046 may receive the IP packet from the STA 1010.

In some embodiments, the STA 1010 and the STA 1030, via the PCRs 1016 and 1046, respectively, may also negotiate a subchannel (or tone or subband) within which to transmit a WUR packet from the STA 1010 to the STA 1030. In other embodiments, the WUR of STA 1030 may always receive a WUR packet on the same subchannel of a channel. Note that the STA 1010 may comprise, e.g., an access point (AP) STA, and may transmit on channels with wide bandwidths of, e.g., 20 MHz. When the STA 1010 transmits to the WURx of the STA 1030, the STA 1010 may transmit the WUR packet on a subchannel of the, e.g., 20 MHz channel. From the perspective of the STA 1010, the 4 MHz bandwidth transmission of the WUR packet is a transmission on a "subchannel" of the 20 MHz channel. From the perspective of the WURx of the STA 1030, the subchannel of the 20 MHz channel may be referenced as the channel or the primary channel of the STA 1030 because, e.g., the WURx receives a 4 MHz bandwidth transmission and not the 20 MHz transmission.

FIGS. 1B-1E illustrate embodiments of WUR physical layer protocol data units (PPDUs) with wake-up preambles to signal low and high data rates for 62.5 Kbps and 250 Kbps for the data portion or MAC frame of a WUR packet. Some embodiments may implement different transmission rates for inclusion in a multi-user transmission. For instance, some embodiments may transmit WUR packets with packets associated with other standards such as IEEE 802.11ax, 802.11an, or 802.11ac.

Embodiments may transmit the WUR packets using pulses of OFDM symbols such as On-Off Keying (OOK) modulation such as 4 microsecond pulses of the OFDM symbols after receipt of a low data rate preamble and 2 microsecond pulses of the OFDM symbols after receipt of a high data rate preamble. The STA 1010 may transmit an OFDM symbol for a duration to indicate a logical one bit, such as two microseconds or four microseconds, and may not transmit a symbol for a duration, such as two microseconds or four microseconds, respectively, to indicate a logical zero bit. The STA 1010 may use the OFDM symbols, advantageously, to reuse an 802.11 Wi-Fi transmitter, to transmit the WUR packets.

The STA 1010 may first generate a signal using OFDM with x subcarriers populated with data, where the number x depends on the bandwidth. Next the STA 1010 may perform an Inverse Fast Fourier Transform (IFFT) (like a normal OFDM transmission) to create a time-domain waveform based on the OFDM symbols. Then the STA 1010 may overlay a bit sequence of logical ones and zeros. The STA 1010 may overlay the signal by multiplying the bit sequence by the time-domain signal derived from the OFDM symbols. The STA 1010 does not transmit a signal for the parts of the time domain signal where the overlay bit sequence is zero and does transmit a signal for the parts of the time domain signal where the overlay is 1. This process creates OOK modulated signals since the signals are either transmitted or not transmitted based on the bit sequences of the WUR packet.

A preamble duration of more than 64 microseconds may not be desirable for many high rate applications. Instead, some embodiments may use a 32-bit sequence with a bit duration of two microseconds or a 16-bit sequence with a bit duration (or pulse) of two microseconds or four microseconds. A bit duration of two microseconds means the STA 1010 transmits the signal for two microseconds for a logical 1 bit and does not transmit for two microseconds to communicate a logical zero bit. This higher length sequence (32-bit) can potentially have a smaller sidelobe levels than a 16-bit sequence and hence, advantageously, better detection capability in presence of interference and noise.

In one embodiment, the WUR packet structure for the two different data rates is shown in FIGS. 1B-1F. FIGS. 1B-1D illustrate examples of embodiments with 32-bit WUR preambles and FIGS. 1E-1F illustrate examples of embodiments with 16-bit WUR preambles. The 32-bit WUR preamble sequence for higher rate applications is illustrated in multiple ways: (i) bit 0 followed by a 31-bit PN sequence (ii) bit 0 followed by a repeated 15 bit PN sequence, followed by 0 (iii) a 32-bit binary sequence and may be selected based on a specific metric such as small side lobe levels in the auto-correlation function of the sequence or a sequence with a small PAPR. Similarly, for a 16-bit preamble structure, a sequence of 0 bit followed by a 15-bit PN sequence may be used.

The WUR can generate the 2 us pulse within each bit duration in multiple ways. In one embodiment, for example, the WUR may generate the 2 us pulse may by applying a time-domain mask to a 4 us OFDM pulse, occupying a bandwidth of 4 MHz.

In one embodiment, a WUR may generate a 2 us OFDM based pulse occupying 4 MHz bandwidth via a 32-point FFT in 20 MHz (equivalent subcarrier spacing of 625 KHz). To create a 4 MHz WUR pulse, the WUR may use a total of 6 subcarriers, centered at the DC subcarrier. For example, one such pulse may be obtained by taking the 32-point IFFT of the vector S=1.436*[0 0 0 . . . 0−1−1i −1−1i 1+1i 0−1−1i −1−1i 1+1i 0 0 0 . . . 0]. The pulse obtained by taking the 32 point IFFT of the vector S=c*[0 0 0 . . . 0−1 −1−1 0 1−1 1 0 0 0 . . . 0] provides the lowest PAPR (PAPR value of 2.6 dB); S=c*[0 0 0 . . . 0 1 1−1 0−1 1 1 0 0 0 . . . 0] provides best performance, measured in terms of required SNR to meet 10% PER, in Channel D; S=c*[0 0 0 . . . 0 1−1 1 0−1 1−1 0 0 0 . . . 0] provides best performance, measured in terms of required SNR to meet 10% PER, in AWGN; S=c*[0

0 0 . . . 0 1 1–1 0–1 –1 1 0 0 0 . . . 0] provides good tradeoff between the performance and PAPR. In the above IFFT vectors (S), c is a complex scalar that normalizes the energy in the pulse. It is understood that the above descriptions are for purposes of illustration and are not meant to be limiting.

FIG. 1B illustrates an embodiment of a WUR PPDU 1100 with a 20 MHz bandwidth comprising a WUR packet with a 4 MHz bandwidth. The WUR packet may comprise a wake-up preamble 1110 signaling a low data rate (LDR) transmission of 62.5 Kbps for the data portion (or MAC frame) of the WUR packet. The WUR PPDU 1100 may comprise an 802.11 preamble followed by a WUR mark followed by a WUR packet. In some embodiments, the WUR packet is included in resource units (RUs) of a transmission with communications to other devices such as other WURxs and/or 802.11ax devices in other RUs.

The WUR PPDU 1100 comprises an 802.11 preamble, a WUR mark, and a WUR packet. The WUR packet may comprise a WUR preamble 1110 and a MAC frame. The 802.11 preamble as illustrated, may be a legacy preamble that comprises a short training field (STF), a long training field (LTF), and a signal field (SIG). Some embodiments may employ more than one STF, more than one LTF, and/or more than one SIG. For instance, embodiments that transmit 802.11ax frames in other resource units of the WUR PPDU may include a legacy preamble similar to that shown as well as a high efficiency (HE) preamble as illustrated in FIG. 2D. For packets that are transmitted to one or more WURxs, the WUR PPDU 1100 may only include a legacy 802.11 preamble to communicate a network allocation vector (NAV) to legacy devices and legacy compatible devices in the BSS.

The WUR mark may include pulse or symbol to identify the forthcoming WUR packet to other devices. For instance, the WUR mark may include a Binary Phase-shift keying (BPSK)-modulated OFDM symbol to cause 802.11n devices to identify the WUR PPDU 1100 as a legacy 802.11a/g packet to prevent any coexistence issues. In such embodiments, transmission of the WUR mark prior to the WUR preamble 1110 may avoid a false detection of the WUR packet by an 802.11n auto detection mechanism as an 802.11n packet with a higher probability. For situations of false detection, once a high throughput signal cyclic redundancy check (HT-SIG CRC) fails, the 802.11n devices drop the clear channel assessment (CCA) threshold to −62 dbm (decibel-milliwatts) of energy detect as opposed to −82 dbm of preamble detect. This is problematic and can cause collision and coexistence issues. The WUR mark may help 802.11 device to correctly set the CCA threshold setting. In other embodiments, the STA 1010 may implement the WUR mark with a different modulation and coding scheme.

In many embodiments, the STA 1010 may transmit the 802.11 preamble and the WUR mark at a 20 MHz bandwidth. In other embodiments, the STA 1010 may transmit the WUR mark at a different bandwidth than the 802.11 preamble. For instance, the STA 1010 may transmit the WUR mark at the same bandwidth as the transmission of the wake-up preamble 1110.

After transmitting the WUR mark, the STA 1010 may transmit the WUR preamble 1110. The STA 1010 may transmit the WUR preamble 1110 with an OOK modulation and, in some embodiments, may apply Manchester coding.

The WUR preamble 1110 may comprise a 32-bit bit sequence comprising a zero-bit followed by a first 15-bit PN sequence, a second 15-bit PN sequence, and a zero-bit. The station 1010 may transmit the wake-up preamble 1110 at one bit every four microseconds so the total transmission time for the wake-up preamble 1110 may be 128 microseconds.

In many embodiments, the first and second 15-bit sequence are two repetitions of the same 15 bit PN sequence. In other embodiments, the 15-bit PN sequences are different. In still other embodiments, the 15-bit sequences are not PN sequences.

After transmitting the WUR preamble 1110, the STA 1010 may transmit the MAC frame at a rate of 62.5 Kbps. To illustrate, some embodiments may transmit the MAC frame with one OOK chip transmission during a 4× symbol duration. The chip may represent a (1,0) for a logical one and a (0,1) for a logical zero with Manchester coding. Assuming that the OFDM 4× symbol duration is 12.8 microseconds and the cyclic prefix is nominally 3.2 microseconds, such embodiments transmit a chip every 16 microseconds and the transmission rate for the WUR packet is 62.5 kbps. In many embodiments, the PHY transmits the chip of (1,0) by transmitting the signal for 8 microseconds and not transmitting the signal for 8 microseconds. Similarly, the PHY transmits the chip of (0,1) by not transmitting the signal for 8 microseconds and transmitting the signal for 8 microseconds.

The MAC frame may be any type of WUR frame such as a beacon, a WUP, or the like. In some embodiments, the MAC frame may comprise an action frame such as the WUR frame illustrated in and discussed in conjunction with FIG. 2E.

After transmission of the WUR packet 1100 the WUR circuitry of the PHY of the receiving device, which is the STA 1030 in this embodiment, may detect the preamble, decode the rate of transmission (if capable of multiple rates), and decode the receiver address. In the present embodiment, the rate of transmission for the MAC frame is associated with the format of the WUR preamble 1110. In some embodiments, the rate of the transmission of the WUR preamble 1110 is constant regardless of the rate of transmission negotiated for the WUR packet but the PHY transmits the MAC frame at the negotiated transmission rate.

Once the WUR circuitry decodes the receiver address in the MAC header, the MAC logic circuitry 1048 may determine if the receiver address is addressed to the STA 1030. The receiver address may be a MAC address, a WUR address, an association identifier (AID), a broadcast address that identifies a group of receiving devices, or other address. The WUR packet may include a full address, a partial address, or a compressed address (such as a hash of the full or partial address).

FIGS. 1C-1F illustrate alternative embodiments of WUR PPDUs 1200, 1300, 1400, and 1500 with WUR preambles 1210, 1310, 1410, and 1510, respectively, for high data rate transmissions such as 250 Kbps. The STA 1010 may implement each of the with WUR preambles 1210, 1310, 1410, and 1510, or one or more of these preambles. Each WUR PPDU 1200, 1300, 1400, and 1500 comprises an 802.11 preamble, a WUR mark, a WUR preamble, and a MAC frame. Similar to the discussions with respect to FIG. 1B, the 802.11 preamble as illustrated, comprises a short training field (STF), a long training field (LTF), and a signal field (SIG) but some embodiments may employ more than one STF, more than one LTF, and/or more than one SIG. Furthermore, some embodiments may transmit other 802.11 frames in other resource units of the transmission and may include a legacy preamble similar to that shown as well as a high efficiency (HE) preamble, a high throughput (HT) preamble, a very high throughput (VHT) preamble, a very high efficiency (VHE) preamble, or the like. For packets that are only transmitted to one or more WURxs, the WUR packets 1200, 1300, 1400, and 1500 may only include a legacy 802.11 preamble to communicate a network allocation vector (NAV) to legacy devices and legacy compatible devices in the BSS.

FIG. 1C illustrates a WUR PPDU 1200 with a 20 MHz bandwidth comprising a WUR packet with a 4 MHz bandwidth. The STA 1010 may generate the WUR packet with the WUR preamble 1210 to signal a high data rate (HDR) for the WUR data portion. In many embodiments, the WUR preamble 1210 signals an HDR of 250 Kbps for the MAC portion of the WUR packet 1200.

After transmitting the WUR mark, the STA 1010 may transmit the WUR preamble 1210. The STA 1010 may transmit the WUR preamble 1210 using an OOK modulation and, in some embodiments, may apply Manchester coding. To illustrate, some embodiments may transmit the WUR preamble 1210 with one OOK chip transmission during a 1× symbol duration. The chip may represent a (1,0) for a logical one and a (0,1) for a logical zero with Manchester coding. In many embodiments, the STA 1010 may transmit each bit with a two-microsecond pulse. In several embodiments, the STA 1010 may generate the two-microsecond pulse with a 32-bit Fast Fourier Transform (FFT) in a 20 MHz bandwidth with a subcarrier spacing of 625 KHz. The STA 1010 may generate the two-microsecond pulse with a four MHz bandwidth, which involves six subcarriers. This will advantageously save transmit energy over time-domain masking of a four-microsecond pulse and potentially reduce the frequency domain support of the pulse beyond 4 MHz over time-domain masking of a four-microsecond pulse.

In other embodiments, the two-microsecond pulse may be a four-microsecond pulse that is masked. For instance, the STA 1010 may apply a time-domain mask to block half of the four-microsecond pulse to produce the two-microsecond pulse. In such embodiments, the four-microsecond pulse uses a 64-point Fast Fourier Transform (FFT) in a 20 MHz bandwidth with a subcarrier spacing of 312.5 KHz.

The WUR preamble 1210 may comprise a 32-bit bit sequence comprising a zero-bit followed by a first 15-bit PN sequence, a second 15-bit PN sequence, and a zero-bit. The STA 1010 may transmit the WUR preamble 1210 at one bit every two microseconds so the total transmission time for the WUR preamble 1210 may be 64 microseconds. In many embodiments, the preamble sequence, such as the 32-bit sequence, is chosen based on a specific metric such as small sidelobe levels in the auto-correlation function of the sequence or a sequence with a small peak-to-average power ratio (PAPR).

In many embodiments, the first and second 15-bit sequence are two repetitions of the same 15 bit PN sequence. In other embodiments, the 15-bit PN sequences are different. In still other embodiments, the 15-bit sequences are not PN sequences.

After transmitting the WUR preamble 1210, the STA 1010 may transmit the MAC frame. The MAC frame may be any type of WUR frame such as a beacon, a wake-up frame, or the like. In some embodiments, the MAC frame may comprise an action frame such as the WUR frame illustrated in and discussed in conjunction with FIG. 2E.

In several embodiments, the STA 1010 transmits the MAC frame at a different data rate than the WUR preamble 1210. In other embodiments, the STA 1010 transmits the MAC frame at the same data rate as the WUR preamble 1210.

After transmission of the WUR PPDU 1200, the WUR circuitry 1054 of the PHY of the receiving device, which is the STA 1030 in this embodiment, may detect the preamble, decode the rate of transmission (if capable of multiple rates), and decode the receiver address.

FIG. 1D illustrates a WUR PPDU 1300 with a 20 MHz bandwidth comprising a WUR packet with a 4 MHz bandwidth. The STA 1010 may generate the WUR packet with the WUR preamble 1310 to signal a high data rate (HDR) for the WUR data portion of the WUR packet. In many embodiments, the WUR preamble 1310 signals a HDR of 250 Kbps for the MAC portion of the WUR PPDU 1300.

After transmitting the WUR mark, the STA 1010 may transmit the WUR preamble 1310. The STA 1010 may transmit the WUR preamble 1310 with an OOK modulation and, in some embodiments, may apply Manchester coding. To illustrate, some embodiments may transmit the WUR preamble 1310 with one OOK chip transmission during a 1× symbol duration. In many embodiments, the STA 1010 may transmit each bit using a two-microsecond pulse. In several embodiments, the STA 1010 may generate the two-microsecond pulse with a 32-bit Fast Fourier Transform (FFT) in a 20 MHz bandwidth with a subcarrier spacing of 625 KHz. The STA 1010 may generate the two-microsecond pulse with an OFDM symbol having a four MHz bandwidth, which involves six subcarriers.

In other embodiments, the two-microsecond pulse may be a four-microsecond pulse that the STA 1010 masks in the time domain to block half of the pulse to produce the two-microsecond pulse. In such embodiments, the four-microsecond pulse uses a 64-point Fast Fourier Transform (FFT) in a 20 MHz bandwidth with a subcarrier spacing of 312.5 KHz.

The WUR preamble 1310 may comprise a 32-bit bit sequence comprising a zero-bit followed by a 31-bit PN sequence. The STA 1010 may transmit the WUR preamble 1310 at a transmission rate of one bit every two microseconds so the total transmission time for the WUR preamble 1310 may be 64 microseconds. In other embodiments, the 31-bit sequence is not a PN sequence. In many embodiments, the PHY transmits the logical one bit by transmitting the OOK symbol signal for two microseconds and the logical zero bit by not transmitting the OOK symbol signal for two microseconds.

After transmitting the WUR preamble 1310, the STA 1010 may transmit the MAC frame. The MAC frame may be any type of WUR frame such as a beacon, a wake-up frame, or the like. In some embodiments, the MAC frame may comprise an action frame such as the WUR frame illustrated in and discussed in conjunction with FIG. 2E.

After transmission of the WUR PPDU 1300, the WUR circuitry 1054 of the PHY of the receiving device, which is the STA 1030 in this embodiment, may detect the preamble, decode the rate of transmission (if capable of multiple rates), and decode the receiver address.

FIG. 1E illustrates a WUR PPDU 1400 with a 20 MHz bandwidth comprising a WUR packet with a 4 MHz bandwidth. The STA 1010 may generate the WUR packet with the WUR preamble 1410 to signal a high data rate (HDR) for the WUR data portion of the WUR packet. In many embodiments, the WUR preamble 1410 signals a HDR of 250 Kbps for the MAC portion of the WUR packet 1400.

After transmitting the WUR mark, the STA 1010 may transmit the WUR preamble 1410. The STA 1010 may transmit the WUR preamble 1410 using an OOK modulation and, in some embodiments, may apply Manchester coding. To illustrate, some embodiments may transmit the WUR preamble 1410 with one OOK chip transmission during a 1× symbol duration. In many embodiments, the STA 1010 may transmit each bit using a two-microsecond pulse. In several embodiments, the STA 1010 may generate the two-microsecond pulse with a 32-bit Fast Fourier Transform (FFT) in a 20 MHz bandwidth with a subcarrier spacing of 625 KHz. The STA 1010 may generate the two-microsecond pulse with a four MHz bandwidth, which involves six subcarriers.

In other embodiments, the two-microsecond pulse may be a four-microsecond pulse that the STA 1010 masks in the time domain to block half of the pulse to produce the two-microsecond pulse. In such embodiments, the four-microsecond pulse uses a 64-point Fast Fourier Transform (FFT) in a 20 MHz bandwidth with a subcarrier spacing of 312.5 KHz.

The WUR preamble 1410 may comprise a 16-bit bit sequence comprising a zero-bit followed by a 15-bit PN sequence. The STA 1010 may transmit the WUR preamble 1410 at a one bit every two microseconds so the total transmission time for the WUR preamble 1410 may be 32 microseconds. In other embodiments, the 15-bit sequence is not a PN sequence. In many embodiments, the PHY transmits the logical one bit by transmitting the OOK symbol signal for two microseconds and the logical zero bit by not transmitting the OOK symbol signal for two microseconds.

After transmitting the WUR preamble 1410, the STA 1010 may transmit the MAC frame. The MAC frame may be any type of WUR frame such as a beacon, a wake-up frame, or the like. In some embodiments, the MAC frame may comprise an action frame such as the WUR frame illustrated in and discussed in conjunction with FIG. 2E.

In several embodiments, the STA 1010 transmits the MAC frame at a different data rate than the WUR preamble 1410. In other embodiments, the STA 1010 transmits the MAC frame at the same data rate as the WUR preamble 1410.

After transmission of the WUR PPDU 1400, the WUR circuitry 1054 of the PHY of the receiving device, which is the STA 1030 in this embodiment, may detect the preamble, decode the rate of transmission (if capable of multiple rates), and decode the receiver address.

FIG. 1F illustrates a WUR PPDU 1500 with a WUR preamble 1510. The WUR preamble 1510 may signal a high data rate (HDR) for the WUR data portion (the MAC frame). In many embodiments, the WUR preamble 1510 signals an HDR of 250 Kbps for the MAC portion of the WUR PPDU 1500.

After transmitting the WUR mark, the STA 1010 may transmit the WUR preamble 1510. The STA 1010 may transmit the WUR preamble 1510 with an OOK modulation and, in some embodiments, may apply Manchester coding. To illustrate, some embodiments may transmit the WUR preamble 1510 with one OOK symbol transmission during a 1× symbol duration for OFDM. In many embodiments, the STA 1010 may transmit each bit of the WUR preamble 1510 with a four-microsecond pulse. In several embodiments, the STA 1010 may generate the four-microsecond pulse with a 64-bit Fast Fourier Transform (FFT) in a 20 MHz bandwidth with a subcarrier spacing of 312.5 KHz. The STA 1010 may generate the four-microsecond pulse with a four MHz bandwidth, which involves 13 subcarriers.

In many embodiments, the STA 1010 transmits a bit of the WUR preamble 1510 every four-microseconds. The STA 1010 may transmit the data portion of the WUR packet 1500, which may be the MAC frame, at 250 Kbps. In many embodiments, the PHY transmits the logical one bit of the WUR preamble 1510 of the WUR PPDU 1500 by transmitting the OOK symbol signal for 4 microseconds and the logical zero bit by not transmitting the OOK symbol signal for 4 microseconds.

The WUR preamble 1510 may comprise a 16-bit bit sequence comprising a zero-bit followed by a 15-bit PN sequence. The STA 1010 may transmit the WUR preamble 1510 at a transmission rate of one bit every four microseconds so the total transmission time for the WUR preamble 1510 may be 64 microseconds. In other embodiments, the 15-bit sequence is not a PN sequence.

After transmitting the WUR preamble 1510, the STA 1010 may transmit the MAC frame. The MAC frame may be any type of WUR frame such as a beacon, a wake-up frame, or the like. In some embodiments, the MAC frame may comprise an action frame such as the wake-up frame illustrated in and discussed in conjunction with FIG. 2E.

In several embodiments, the STA 1010 transmits the MAC frame at a higher data rate than the WUR preamble 1510. For instance, the STA 1010 may transmit the MAC frame at 250 Kbps in this embodiment. In other embodiments, the STA 1010 transmits the MAC frame at the same data rate or a lower data rate than the WUR preamble 1510.

After transmission of the WUR PPDU 1500, the WUR circuitry 1054 of the PHY of the receiving device, which is the STA 1030 in this embodiment, may detect the preamble, decode the rate of transmission (if capable of multiple rates), and decode the receiver address.

FIG. 1G illustrates an embodiment of a wake-up receiver (WURx) front end 1600 for WUR circuitry such as the WUR circuitry 1054 illustrated in FIG. 1A. The WURx front end 1600 may comprise logic circuitry to correlate and analyze an incoming WUR preamble. The logic circuitry may comprise circuitry to perform the correlation and analysis or may comprise a combination of circuitry and logic circuitry such as a state machine, a specific purpose processor, a processor and code, or the like. The correlator 1610 may receive an incoming signal that includes a WUR preamble 1110, 1310, 1410, or 1510.

The correlator 1610 may also receive or otherwise comprise a common preamble sequence for low data rate (LDR) signals and high data rate (HDR) signals such as a 32-bit sequence for correlating against the incoming signal. In some embodiments, the correlator 1610 may continually compare bits of an incoming signal until a portion of the signal matches the common preamble sequence.

In some embodiments, the common preamble sequence input is a series of repeated common preamble sequences such as 15-bit sequences or 31-bit sequences. In this embodiment, the common preamble sequence input is a zero-bit followed by a 15-bit PN sequence followed by the 15-bit PN sequence again and followed by a final zero-bit. The 15-bit PN sequence is included in both a WUR preamble 1110 that signals an LDR for the data portion of a WUR packet and a WUR preamble 1410 or 1510 that signals an HDR for the data portion of a WUR packet. For the purposes of this example, the LDR preamble is the WUR preamble 1110 and the HDR preamble is the WUR preamble 1410 or 1510. Also, for the purposes of this example, the 15-bit pn sequences in each of these WUR preambles 1110, 1410, and 1510 are the same sequence.

In this embodiment, the WURx front end 1600 can distinguish between the LDR preamble 1110 and the HDR preamble 1410 or 1510 by correlating the incoming WUR preamble against the common preamble sequence. In some embodiments, the WURx front end 1600 may include more than one correlator such as the correlator 1610. The correlator 1610 may compare the incoming WUR preamble against multiple common preamble sequences. One or more analyzers 1620 may determine the rate associated with the incoming WUR preamble based on the output of the correlators such as the correlator 1610.

The correlator 1610 may output peak correlations that have a peak value based on how closely a portion of the incoming signal matches the common preamble. If the incoming signal is the WUR preamble 1110, as the preamble is correlated, the correlator 1610 may correlate portions of the incoming signal that are the same length as the common preamble sequence input. So as the incoming signal begins to enter the correlator 1610, the correlator 1610 will detect a first peak value when the first 15-bit sequence of the wake-up preamble 1110 is received. This first peak value will be based on the correlation of the one 15-bit PN sequence against the two repetitions of the 15-bit PN sequence in the common preamble sequence input. The second peak value will be larger due to the higher correlation of both 15-bit PN sequences in the incoming signal against both 15-bit PN sequences in the common preamble input. A third peak value will result from a correlation of the second 15-bit PN sequence and a portion of the MAC frame against the common preamble sequence input.

The analyzer 1620 may receive the peak values and determine that the incoming signal is the LDR preamble, WUR preamble 1110, because the peak value followed by a large peak value followed by another peak value is characteristic of the WUR preamble 1110. The analyzer 1620 may output an indication of the LDR to a portion of the WURx front end 1600 to capture the MAC frame of the WUR packet at the LDR of, e.g. 62.5 Kbps.

To further illustrate, the incoming signal may be a WUR preamble that signals a high data rate (HDR) for the MAC frame portion of the WUR packet such as the WUR preambles 1410 or 1510. The correlator 1610 may compare the incoming signal, the WUR preamble 1410 or 1510, against the common preamble sequence input that is the zero-bit followed by a 15-bit PN sequence, followed by another repetition of the 15-bit PN sequence, and followed by another zero-bit. The correlator 1610 may detect a first peak value when the 15-bit PN sequence of the incoming signal is compared against the first 15-bit PN sequence of the common preamble sequence input and may detect a second peak value that is approximately the same as the first peak value when part of the MAC frame and the 15-bit PN sequence of the incoming signal is compared against the common preamble sequence input.

The correlator 1610 may output the two peak values to the analyzer 1620 and the analyzer 1620 may determine that the incoming signal is an HDR preamble such as the WUR preamble 1410 or 1510 based on the magnitude of the two peak values and the timing between receipt of the two peak values. Thereafter, the analyzer 1620 may output an indication that the data rate for the incoming MAC frame of the WUR packet is the HDR such as 250 Kbps so that the WURx can adjust the capture rate of samples from the incoming signal to detect bits in the incoming signal.

The WUR of each communications device may have a unique address. In some embodiments, the address of the WUR differs from the address assigned to a PCR of the communications device, such as the MAC address or AID of an IEEE 802.11ax main radio. In other embodiments, the addresses of the PCR and the WUR are the same.

One challenge with multi-user transmission comprising a WUR packet along with IEEE 802.11ax packets is blocking the adjacent interference to WUR, which may be an inexpensive and low power consuming device. Also, the interference from WUR to the IEEE 802.11ax receiver should not cause any degradation in 802.11ax performance.

Some embodiments may populate 802.11ax OFDMA subcarriers of 4×Symbol duration to generate a WUR packet. By doing so, due to orthogonality of subcarriers, the WUR packet may not cause any interference to 802.11ax. Embodiments may also or alternatively leave adjacent resource units (RUs) blank, or without a data signal to reduce the interference from 802.11ax to the WUR. Note that using 802.11ax OFDMA numerology with 4×Symbol duration will generate lower data rate transmission for a WUR packet. As a result, many embodiments may also comprise an embedded encoder to avoid reducing the data rate to ¼th of 1×Sym duration.

FIG. 1H illustrates embodiments of WUR preambles 1700 and 1710 to distinguish a low data rate (LDR) and a high data rate (HDR), respectively. In this embodiment, the channel bandwidth is 20 megahertz (MHz) and the WUR packet transmission is on a 4 MHz sub-band of the 20 MHz channel. The WUR preamble 1700 to signal the LDR may transmit with a duration of 128 microseconds and may have twice the number of bits (twice the bit count or twice the length in bits) as the WUR preamble 1710 to signal the HDR. The WUR preamble 1710 to signal the HDR may transmit with a duration of 64 microseconds and may have half the number of bits (half the bit count or half the length in bits) as the WUR preamble 1700 to signal the LDR.

The STAs 1010 and 1030 comprise processor(s) 1001 and 1031, and memory 1011, and 1041, respectively. The processor(s) 1001 and 1031 may comprise any data processing device such as a microprocessor, a microcontroller, a state machine, and/or the like, and may execute instructions or code in the memory 1011 and 1041. The memory 1011 and 1041 may comprise a storage medium such as Dynamic Random-Access Memory (DRAM), read only memory (ROM), buffers, registers, cache, flash memory, hard disk drives, solid-state drives, or the like. The memory 1011 and 1041 may store the frames, frame structures, frame headers, or the like, and may also comprise code WUR logic.

A timestamp is a value from a timing synchronization function (TSF) timer in an AP such as the STA 1010 that the AP uses to synchronize the stations associated with the BSS and in the STA 1030 so that the STA 1030 can synchronize its TSF timer 1035 with that of the AP while associated with the AP to synchronize communications. The TSF timer, such as TSF timers 1005 and 1035 in FIG. 1A, may reside in a chipset of the station such as STAs 1010 and 1030, in some embodiments, and may reside elsewhere in the station in other embodiments.

The AP may transmit the beacon frame periodically and capture the value in the timing synchronization function (TSF) timer at the time of, concurrent with, or contemporaneous with, transmission to include in a frame body of the beacon frame as the timestamp. A station, such as the STA 1030 in FIG. 1A, receives the beacon frame via the primary connectivity radio (PCR) such as the wireless network interface 1052 and corrects the TSF timer 1035 for the station 1030. The correction of the TSF timer for the station 1030 synchronizes the station with the BSS by updating the value in the TSF timer 1035.

The MAC logic circuitry 1018 and 1048 may comprise one or more circuits to implement MAC layer functionality and management service interfaces through which MAC layer management functions may be invoked. The MAC logic circuitry 1018 and 1048 may comprise one or more processors to execute MAC layer code stored in the memory 1011 and 1041, respectively. In other embodiments, the MAC logic circuitry 1018 and 1048 may comprise interface circuitry to execute code on the one or more processors 1001 and 1031, respectively.

The MAC logic circuitry 1018 and 1048 may communicate with the physical layer (PHY) logic circuitry of wireless network interfaces 1022 and 1052, respectively, to transmit a PHY frame such as a channel sounding packet or may provide a MAC frame such as a management frame to the PHY logic circuitry to transmit to the STA 1030 and the STA 1010, respectively. The MAC logic circuitry 1018 and 1048 may generate frames such as management, data, and control frames.

The PHY logic circuitry of wireless network interfaces 1022 and 1052 may prepare the MAC frame for transmission by, e.g., determining a preamble to prepend to a MAC frame to create a PHY frame. The preamble may include one or more short training field (STF) values, long training field (LTF) values, and signal (SIG) field values. The wireless network interfaces 1022 and 1052 may be PHY layer devices including a transmitter and a receiver and the transmitter may process the PHY frame to transmit.

After processing the PHY frame, radios 1026 and 1056, each comprising an RF transmitter and an RF receiver, may impress digital data onto subcarriers of RF frequencies for transmission by electromagnetic radiation via elements of an antenna array or antennas 1028 and 1058, respectively. The RF receiver receives electromagnetic energy, extracts the digital data, and decodes the frame.

Figure 2A:
FIG. 2A depicts an embodiment of transmissions between four stations and an AP.
Figure 2B:
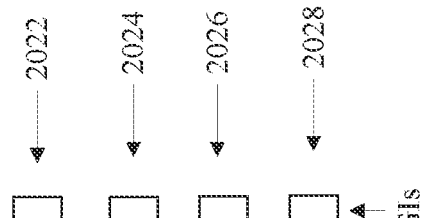
FIG. 2B depicts an embodiment of a transmission between one station and an AP.
Figure 2C:
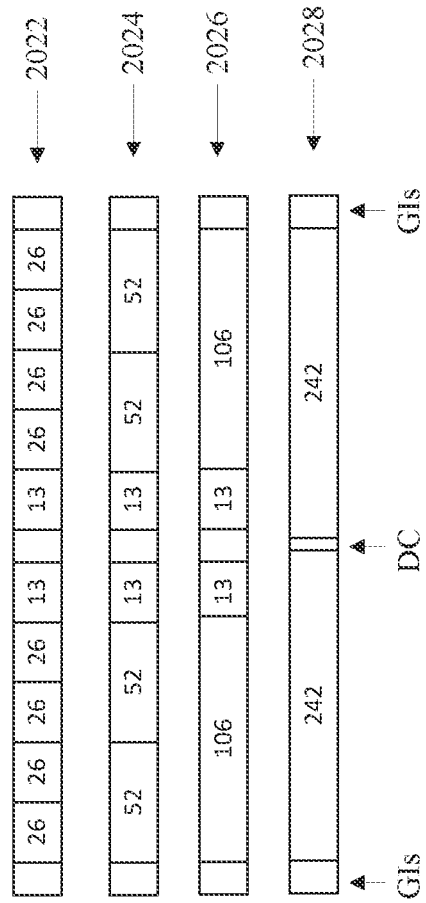
FIG. 2C depicts an embodiment of a resource units in a 20 Megahertz (MHz) bandwidth.
Figure 2D:
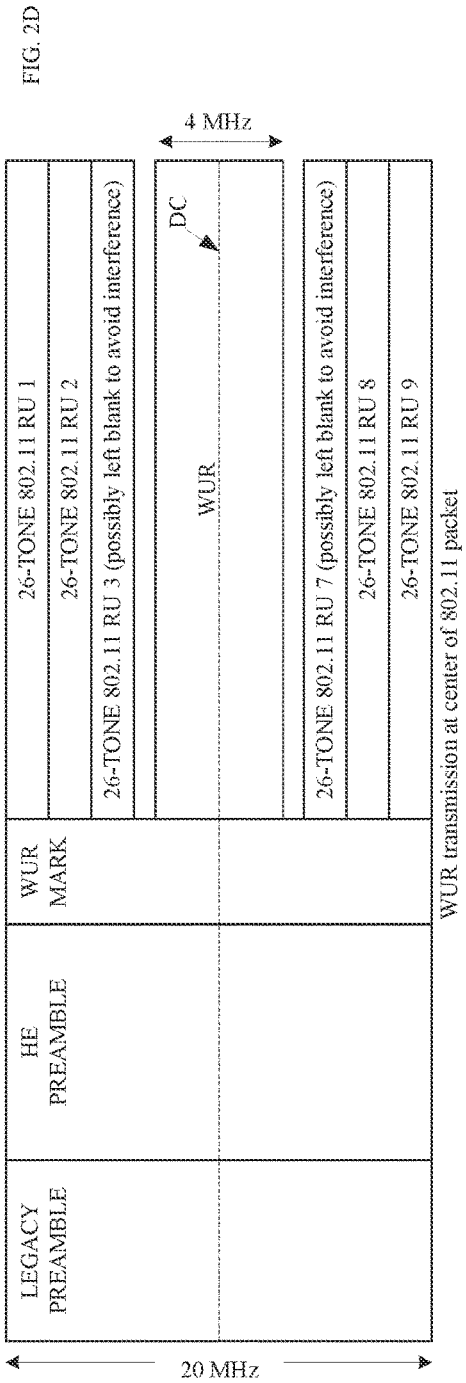
FIG. 2D depicts an embodiment of an IEEE 802.11ax orthogonal frequency-division multiple access (OFDMA) modulated signal with a compatible wake-up radio signal at the center resource unit.

FIGS. 2A-2C illustrate embodiments of channels and subchannels (or resource units) that can facilitate multiple transmissions simultaneously along with transmission of a WUR PPDU. FIG. 2A illustrates an embodiment of transmissions 2010 between four stations and an AP on four different subchannels (or resource units) of a channel via OFDMA. Grouping subcarriers into groups of resource units is referred to as subchannelization. Subchannelization defines subchannels that can be allocated to stations depending on their channel conditions and service requirements. An OFDMA system may also allocate different transmit powers to different subchannels.

In the present embodiment, the OFDMA STA1, OFDMA STA2, OFDMA STA3, and OFDMA STA4 may represent transmissions on a four different subchannels of the channel. For instance, transmissions 2010 may represent an 80 MHz channel with four 20 MHz bandwidth WUR PPDUs using frequency division multiple access (FDMA). Such embodiments may include, e.g., 1 WUR packet per 20 MHz bandwidth WUR PPDU, 2 WUR packets in a 40 MHz bandwidth PPDU, and 4 WUR packets in an 80 MHz bandwidth WUR PPDU. As a comparison, FIG. 2B illustrates an embodiment of an orthogonal frequency division multiplexing (OFDM) transmission 2015 for the same channel as FIG. 2A. The OFDM transmission 2015 may use the entire channel bandwidth.

FIG. 2C illustrates an embodiment of a 20 Megahertz (MHz) bandwidth 2020 on a channel that illustrates different resource unit (RU) configurations 2022, 2024, 2026, and 2028. In OFDMA, for instance, an OFDM symbol is constructed of subcarriers, the number of which is a function of the physical layer protocol data unit (PPDU) (also referred to as the PHY frame) bandwidth. There are several subcarrier types: 1) Data subcarriers which are used for data transmission; 2) Pilot subcarriers which are utilized for phase information and parameter tracking; and 3) unused subcarriers which are not used for data/pilot transmission. The unused subcarriers are the direct current (DC) subcarrier, the Guard band subcarriers at the band edges, and the Null subcarriers.

The RU configuration 2022 illustrates an embodiment of nine RUs that each include 26 subcarriers for data transmission including the two sets of 13 subcarriers on either side of the DC. The RU configuration 2024 illustrates the same bandwidth divided into 5 RUs including four RUs with 52 subcarriers and one RU with 26 subcarriers about the DC for data transmission. The RU configuration 2026 illustrates the same bandwidth divided into 3 RUs including two RUs with 106 subcarriers and one RU with 26 subcarriers about the DC for data transmission. And the RU configuration 2028 illustrates the same bandwidth divided into 2 RUs including two RUs with 242 subcarriers about the DC for data transmission. Embodiments may be capable of additional or alternative bandwidths such as such as 40 MHz, 80 MHz, 160 MHz and 80+80 MHz.

FIG. 2D illustrates an embodiment of a WUR PPDU in the form of an 802.11, multi-user, orthogonal frequency division multiple access (OFDMA) packet that is capable of multiple transmissions on different RUs of a 20 MHz channel. In some embodiments, the WUR circuitry may transmit a WUP on a sub-band of the WUR PPDU transmission without transmitting packets in other sub-bands of the channel. The basic idea is shown by the example given in FIG. 2D, where the PHY transmits the WUR packet at the center of the band in a multi-user OFDMA transmission that multiplexes, e.g., IEEE 802.11ax transmissions in frequency within the same multi-user OFDMA packet. In other words, the PHY transmits multiple different packets on different resource units or frequency sub-bands within the channel simultaneously.

Many embodiments transmit a WUR preamble of the WUR PPDU to synchronize with a WUR of another device. In some embodiments, the WUR preamble may signal a transmission rate for a medium access control (MAC) layer packet that follows the WUR preamble. Other embodiments may only be capable of receiving the WUR packet at one rate.

After transmission of the WUR packet, the WUR circuitry of the PHY of the receiving device may decode the receiver address. Once the WUR circuitry decodes the receiver address, the MAC layer circuitry may determine if the receiver address is addressed to the WUR circuitry. The receiver address may be a MAC address, a WUR address, an association identifier (AID), a broadcast address that identifies a group of receiving devices, or other address. The WUR packet may include a full address, a partial address, or a compressed address (such as a hash of the full or partial address).

The WUR of each communications device may have a unique address. In some embodiments, the address of the WUR differs from the address assigned to PCR of the communications device, such as the MAC address or AID of an IEEE 802.11ax main radio (PCR). In other embodiments, the addresses of the PCR and the WUR are the same.

Figure 2E:
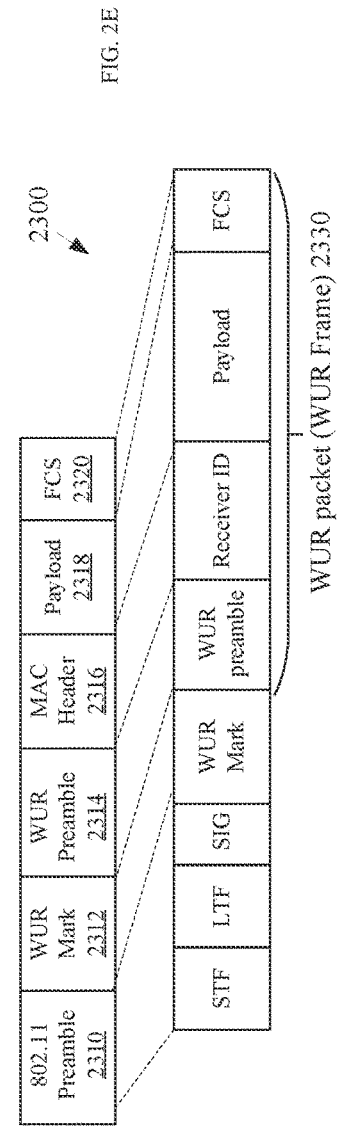
FIG. 2E depicts an embodiment of a wake-up radio packet prepended by an IEEE 802.11 physical layer preamble.
Figure 2F:
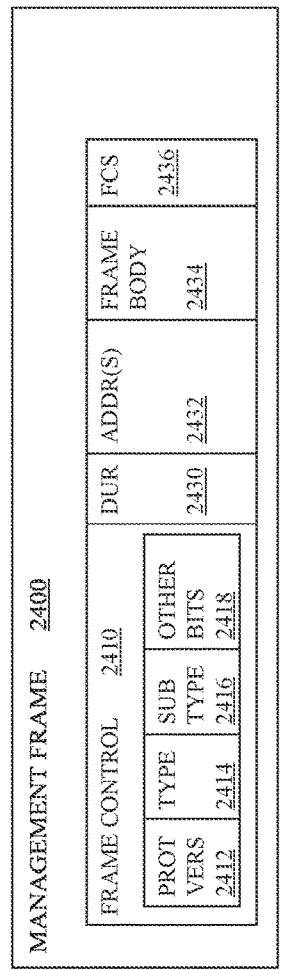
FIG. 2F depicts an embodiment of a management frame.

The FIG. 2E illustrates an embodiment of a WUR PPDU 2300. FIG. 2E illustrates a single STF field, LTF field, and SIG field. These field represent an IEEE 802.11 preamble 2310 such as a legacy IEEE 802.11ah preamble. After the 802.11 preamble, the WUR PPDU 2300 may comprise a WUR mark 2312. For IEEE 802.11ax, the 802.11 preamble 2310 may include a legacy IEEE 802.11 preamble followed by a high efficiency (HE) preamble.

After the 802.11 preamble 2310 and, in some embodiments, a WUR mark 2312, which may be transmitted across the entire bandwidth of the channel, the WUR PPDU 2300 may comprise a WUR packet 2330. The WUR packet 2330 may comprise a WUR preamble 2314, a MAC header 2316, a payload 2318, and a frame check sequence (FCS) 2320 field. The WUR preamble 2314 may include a series of 32 bits. In some embodiments, the WUR preamble 2314 may include one or more repetitions of a sequence. In some embodiments, the WUR preamble 2314 may include more or less bits in the sequence and, in some embodiments, the WUR preamble 2314 may include different sequences of bits in the WUR preamble 2314.

Alternative embodiments include a rate field in the WUR preamble 2314 or immediately following the WUR preamble 2314. The receiver address may follow the rate field, in some embodiments, to facilitate transmission of the receiver address at a different rate than the rate of transmission of the wake-up preamble.

The MAC header 2316 may include a receiver address that may comprise a receiver identifier (ID) such as a partial MAC address. In some embodiments, the MAC header may include more fields.

The payload 2318 may include an action identifier (ID) and an action payload. The action ID may identify the structure of the action payload and the action payload may include an instruction to wake a PCR such as an IEEE 802.11ax radio either immediately or after a period of time. In some embodiments, the period of time may identify a target wake time for the PCR to be ready to receive a packet.

The WUR may implement two or more different packet and/or preamble formats for WUR packets such as one for a higher data rate, e.g., of 250 Kbps using 1×Sym duration as in 802.11n/11ac and one for a lower data rate, e.g., of 62.5 Kbps using 4×Sym duration of 802.11ax. In some embodiments, the WUR may also implement different packet and/or WUR preamble formats for multiple lower data rates.

Although inclusion of more than one preamble formats appears to add a bit more complexity to the design, it is argued that, advantageously, there is no increase in the AP nor the WUR design to add more than one preamble formats to signal different data rates. In the case of the AP, 802.11ax already requires two symbol durations to be supported. And in the WUR, the receiver may use a simple correlator as a detector, so changing the symbol time may only increase the integration time of the receiver.

An advantage of such embodiments is that spectrum utilization can be improved when low data rate is used because an access point (AP) can transmit a WUR packet along with 802.11ax packets simultaneously using OFDMA.

Transmission at the AP may involve utilization of one or more of transmission rates of the WUR packet. Reception at WUR devices may involve a WUR device that is unaware whether the packet is a multi-user (e.g., multiplexed with 802.11ax) or a single user transmission. The WUR receiver may search for preamble sequences and/or a signal field (also referred to as a rate field) to detect the start of the WUR packet and to identify its transmission rate. The rate is either detected through the use of different preamble sequences and/or through decoding of the signal field, or rate field, that carries the rate information.

A WUR capable STA and AP may exchange the capability for supported rate and format and negotiate the supported rates (for embodiments in which the support of one or more rate is optional) and/or subchannel (or tone or subband or RU(s)) location within the channel via PCR when setting up the WUR operation. The above indications such as the supported rates and the subchannel can be in a frame such as the management frame 2400 illustrated in FIG. 2F.

Embodiments may define two or three or more different packet structures for one or more HDR and one or more LDR WUR packets. To enable better spectrum efficiency, some embodiments include LDR transmissions within in, e.g., 802.11ax multi-user OFDMA packets, to allow concurrent transmission of 802.11 packets with a WUR packet. The multi-user transmission may occupy more bandwidth than 4 MHz, which in turn overcomes the regulatory specified Tx-PSD limit (Power Spectral Density limit), and hence the AP can transmit at higher Tx-power (transmission power).

Many embodiments may provide a wireless connectivity solution for mobile/wearable devices that can minimize power consumption.

FIG. 2F depicts an embodiment of a frame 2400 such as an association or reassociation frame. The frame 2400 is one embodiment of a frame that can transmit the WUR capabilities. The choice of fields for communicating information may be application specific. In other embodiments, for example, the frame 2400 may have more or less fields, different fields, and/or fields with different field lengths.

The frame 2400 may comprise a MAC header with a frame control field 2410, a duration field 2430, address(es) field(s) 2432, a sequence control field 2433, a frame body 2434, and a frame check sequence (FCS) field 2436. The frame control field 2410 may comprise a protocol version field 2412, a type field 2414, a subtype field 2416, and other frame control bits 2418. The protocol version field 2412 may represent the revision of the corresponding standard that the frame represents. The type field 2414 may identify the type of frame 2414 as, e.g., a control frame. The subtype field 2416 may identify the subtype of the frame as, e.g., a particular type of control frame such as an association frame. The other frame control bits 2418 may represent additional fields that may be present in the frame control field such as a more fragments field, a retry field, a power management field, a more data field, or the like.

The duration field 2430 may include a duration of a network allocation vector (NAV) reminder in microseconds. The ADDR(s) field(s) 2432 may include a broadcast address to broadcast to each station associated with the STA 1010 or an address of a specific STA. The ADDR(s) field(s) 2432 may include a full or partial address such as a MAC address of a STA.

FIG. 3 depicts an embodiment of an apparatus to generate, transmit, receive, and interpret or decode PHY frames and MAC frames with a WUR packet to support compatible low rate for wake-up radio packet transmission. The apparatus comprises a transceiver 3000 coupled with MAC logic circuitry 3001 and PHY logic circuitry 3002. The MAC logic circuitry 3001 and PHY logic circuitry 3002 may comprise code executing on processing circuitry of a baseband processor and/or other processor; circuitry to implement operations of functionality of the MAC or PHY; or a combination of both. The MAC logic circuitry 3001 may determine a frame such as a WUR frame and the PHY logic circuitry 3002 may determine the physical layer protocol data unit (PPDU) by prepending the frame or multiple frames, also called MAC protocol data units (MPDUs), with a preamble to transmit.

The transceiver 3000 comprises a receiver 3004 and a transmitter 3006. Embodiments have many different combinations of modules to process data because the configurations are deployment specific. FIG. 3 illustrates some of the modules that are common to many embodiments.

In the present embodiment, the transceiver 3000 includes WUR circuitry 3110 and 3120 such as the WUR circuitry 1024 and 1054, respectively, shown in FIG. 1A. The WUR circuitry 3110 may comprise circuitry to use portions of the transmitter 3006 (a transmitter of the PCR) to generate a WUR packet. For instance, the WUR circuitry 3110 may generate, e.g., an OOK signal with OFDM symbols to generate a WUR packet for transmission via the antenna array 3018.

Note that a station such as the STA 1010 in FIG. 1A may comprise multiple transmitters to facilitate concurrent transmissions on multiple contiguous and/or non-contiguous carrier frequencies and WUR circuitry 3110 may couple with more than one of the transmitters or more than one of the transmitters may comprise instances of WUR circuitry to facilitate simultaneous WUR packet transmissions in one or multiple 802.11 packets (WUR PPDUs) on channels with bandwidths such as 40 MHz, 80 MHz, and 160 MHz. In other embodiments, the WUR may comprise an independent circuitry that does not use portions of the transmitter 3006.

The WUR circuitry 3120 may comprise circuitry to use portions of the receiver 3004 while in a WUR mode with the PCR is in a power save mode and the wake-up radio is in a WURx active mode or a WURx inactive mode. The WUR circuitry 3120 may comprise circuitry to use portions of the receiver 3004 (a receiver of the PCR) to receive a WUR packet in the form of, e.g., OFDM OOK symbols while the remainder of the receiver 3004 (the PCR) is in a power save mode. For instance, the WUR circuitry 3120 may comprise one or more correlators such as the correlator 1610 in FIG. 1G and one or more analyzers such as the analyzer 1620 in FIG. 1G.

The transmitter 3006 may comprise one or more of an encoder 3008, a stream deparser 3066, a frequency segment parser 3007, an interleaver 3009, a modulator 3010, a frequency segment deparser 3060, an OFDM 3012, an Inverse Fast Fourier Transform (IFFT) module 3015, a GI module 3045, and a transmitter front end 3040. The encoder 3008 of transmitter 3006 receives and encodes a data stream destined for transmission from the MAC logic circuitry 3001 with, e.g., a binary convolutional coding (BCC), a low-density parity check coding (LDPC), and/or the like. After coding, scrambling, puncturing and post-FEC (forward error correction) padding, a stream parser 3064 may optionally divide the data bit streams at the output of the FEC encoder into groups of bits. The frequency segment parser 3007 may receive data stream from encoder 3008 or streams from the stream parser 3064 and optionally parse each data stream into two or more frequency segments to build a contiguous or non-contiguous bandwidth based upon smaller bandwidth frequency segments. The interleaver 3009 may interleave rows and columns of bits to prevent long sequences of adjacent noisy bits from entering a BCC decoder of a receiver.

The modulator 3010 may receive the data stream from interleaver 3009 and may impress the received data blocks onto a sinusoid of a selected frequency for each stream via, e.g., mapping the data blocks into a corresponding set of discrete amplitudes of the sinusoid, or a set of discrete phases of the sinusoid, or a set of discrete frequency shifts relative to the frequency of the sinusoid. In some embodiments, the output of modulator 3010 may optionally be fed into the frequency segment deparser 3060 to combine frequency segments in a single, contiguous frequency bandwidth of, e.g., 160 MHz. Other embodiments may continue to process the frequency segments as separate data streams for, e.g. a non-contiguous 80+80 MHz bandwidth transmission.

After the modulator 3010, the data stream(s) are fed to an OFDM 3012. The OFDM 3012 may comprise a space-time block coding (STBC) module 3011, and a digital beamforming (DBF) module 3014. The STBC module 3011 may receive constellation points from the modulator 3010 corresponding to one or more spatial streams and may spread the spatial streams to a greater number of space-time streams. Further embodiments may omit the STBC.

The OFDM 3012 impresses or maps the modulated data formed as OFDM symbols onto a plurality of orthogonal subcarriers so the OFDM symbols are encoded with the subcarriers or tones. The OFDM symbols may be fed to the DBF module 3014. Generally, digital beam forming uses digital signal processing algorithms that operate on the signals received by, and transmitted from, an array of antenna elements. Transmit beamforming processes the channel state to compute a steering matrix that is applied to the transmitted signal to optimize reception at one or more receivers. This is achieved by combining elements in a phased antenna array in such a way that signals at particular angles experience constructive interference while others experience destructive interference.

The IFFT module 3015 may perform an inverse discrete Fourier transform (IDFT) on the OFDM symbols to map on the subcarriers. The guard interval (GI) module 3045 may insert guard intervals by prepending to the symbol a circular extension of itself. The GI module 3045 may also comprise windowing to optionally smooth the edges of each symbol to increase spectral decay.

The output of the GI module 3045 may enter the transmitter front end module (TX FEM) 3040. The transmitter front end 3040 may comprise a radio 3042 with a power amplifier (PA) 3044 to amplify the signal and prepare the signal for transmission via the antenna array 3018. In many embodiments, entrance into a spatial reuse mode by a communications device such as a station or AP may reduce the amplification by the PA 3044 to reduce channel interference caused by transmissions.

The transceiver 3000 may also comprise duplexers 3016 connected to antenna array 3018. The antenna array 3018 radiates the information bearing signals into a time-varying, spatial distribution of electromagnetic energy that can be received by an antenna of a receiver. In several embodiments, the receiver 3004 and the transmitter 3006 may each comprise its own antenna(s) or antenna array(s).

The transceiver 3000 may comprise a receiver 3004 for receiving, demodulating, and decoding information bearing communication signals. The receiver 3004 may comprise a receiver front-end module (RX FEM) 3050 to detect the signal, detect the start of the packet, remove the carrier frequency, and amplify the subcarriers via a radio 3052 with a low noise amplifier (LNA) 3054. The RX FEM 3050 may couple with the WUR circuitry 3120 to detect low data rate (LDR) and/or high data rate (HDR) WUR preambles of WUR packets such as the WUR packets shown in FIGS. 1B-1F and 1H. In several embodiments, the WUR circuitry 3120 or the RX FEM 3050 may include one or more correlators and analyzers such as the correlator 1610 and the analyzer 1620 shown in FIG. 1G for detection and identification of an LDR WUR preamble or an HDR WUR preamble.

The receiver 3004 may comprise a GI module 3055 and a fast Fourier transform (FFT) module 3019. The GI module 3055 may remove the guard intervals and the windowing and the FFT module 3019 may transform the communication signals from the time domain to the frequency domain.

The receiver 3004 may also comprise an OFDM 3022, a frequency segment parser 3062, a demodulator 3024, a deinterleaver 3025, a frequency segment deparser 3027, a stream deparser 3066, and a decoder 3026. An equalizer may output the weighted data signals for the OFDM packet to the OFDM 3022. The OFDM 3022 extracts signal information as OFDM symbols from the plurality of subcarriers onto which information-bearing communication signals are modulated.

The OFDM 3022 may comprise a DBF module 3020, and an STBC module 3021. The received signals are fed from the equalizer to the DBF module 3020. The DBF module 3020 may comprise algorithms to process the received signals as a directional transmission directed toward to the receiver 3004. And the STBC module 3021 may transform the data streams from the space-time streams to spatial streams.

The output of the STBC module 3021 may enter a frequency segment parser 3062 if the communication signal is received as a single, contiguous bandwidth signal to parse the signal into, e.g., two or more frequency segments for demodulation and deinterleaving.

The demodulator 3024 demodulates the spatial streams. Demodulation is the process of extracting data from the spatial streams to produce demodulated spatial streams. The deinterleaver 3025 may deinterleave the sequence of bits of information. The frequency segment deparser 3027 may optionally deparse frequency segments as received if received as separate frequency segment signals or may deparse the frequency segments determined by the optional frequency segment parser 3062. The decoder 3026 decodes the data from the demodulator 3024 and transmits the decoded information, the MPDU, to the MAC logic circuitry 3001.

The MAC logic circuitry 3001 may parse the MPDU based upon a format defined in the communications device for a frame to determine the particular type of frame by determining the type value and the subtype value. The MAC logic circuitry 3001 may then interpret the remainder of MPDU.

While the description of FIG. 3 focuses on a single spatial stream system for simplicity, many embodiments are capable of multiple spatial stream transmissions and use parallel data processing paths for multiple spatial streams from the PHY logic circuitry 3002 through to transmission. Further embodiments may include the use of multiple encoders to afford implementation flexibility.

FIGS. 4A-B depict embodiments of flowcharts 4000 and 4100 to transmit communications with a frame. Referring to FIG. 4A, the flowchart 4000 may begin with a wireless network interface of a communications device such as the STAs 1010 and 1030 in FIG. 1A, generating an 802.11 preamble for transmission on a channel (element 4010) such as a high-efficiency preamble shown in FIG. 2D or the legacy 802.11 preamble shown in FIG. 2E. The legacy 802.11 preambles may include, for instance, 802.11a preambles, 802.11n preambles, 802.11ac preambles, and/or other older standard preambles. The wireless network interface may also generate one or more symbols as a WUR mark (element 4012) following, e.g., the legacy 802.11 preamble as shown in FIG. 2E.

A MAC layer logic circuitry of the wireless network interface may generate a MAC frame as a wake-up radio (WUR) packet to transmit to other devices of a network, including a wake-up radio preamble (element 4015) and a frame body. The frame body may include, e.g., a receiver address and a frame body and the MAC layer logic circuitry may pass the MAC frame as an MAC protocol data unit (MPDU) to a PHY logic circuitry of the wireless network interface. The MAC frame may comprise a wake-up packet (WUP) to wake a PCR of a WURx. The PHY logic circuitry may transform or convert the data into a packet of pulses of orthogonal frequency division multiplexing (OFDM) symbols such as on-off keying (OOK) OFDM symbols, that can be transmitted to a STA after transmission of the 802.11 preamble.

The wireless network interface may transmit a wake-up radio preamble on a sub-band of the channel after transmission of the 802.11 preamble as OOK symbols in the time domain and may transmit the remainder of the WUR packet after transmission of the wake-up radio preamble as one or more OOK symbols at a rate indicated by the WUR preamble for transmission on the sub-band (element 4020). For example, a PHY device of the wireless network interface may pass OOK symbols to the radio and antenna array for transmission.

Referring to FIG. 4B, the flowchart 4100 begins with a PCR of a device such as the PCR 1016 in FIG. 1A generating and transmitting, via an antenna array, an 802.11 preamble for a WUR physical layer data unit (PPDU) on a channel (element 4110) with a bandwidth or, e.g., 20 MHz. The PCR may generate a remainder of a 802.11 (PPDU) for a 2 MHz subchannel of the channel as well as a wake-up radio (WUR) packet for a 4 MHz subchannel of the channel concurrently. After transmission of the 802.11 preamble for the WUR PPDU, the PCR may transmit, via an antenna array, the remainder of a 802.11 (PPDU) for the 2 MHz subchannel of the channel as well as the WUR packet for a 4 MHz subchannel of the channel concurrently (element 4115). For example, the PCR may transmit the remainder of the 802.11 PPDU on a first sub-band of the channel at a high-efficiency transmission rate and WUR circuitry may concurrently transmit the WUR packet with a MAC frame.

Referring to FIG. 4C, the flowchart 4250 begins with a wake-up radio logic circuitry of a wake-up radio receiver, such as the WUR logic circuitry 1050 and WUR circuitry 1054 in FIG. 1A, receiving and decoding, via an antenna array, a wake-up radio preamble for a wake-up radio frame on one of the sub-channels of a channel (element 4252). The wake-up radio logic circuitry may decode the preamble to determine the rate of the transmission for the wake-up radio frame (element 4254).

After identifying the transmission rate from the wake-up radio preamble, the WUR logic circuitry may receive the MAC frame from the PHY based on the data transmission rate (element 4256).

FIGS. 4D-E depict embodiments of flowcharts 4300 and 4400 to transmit, receive, and interpret communications with a frame. Referring to FIG. 4D, the flowchart 4300 may begin with receiving a WUR frame from the PCR 1080 (or the WUR circuitry 1024) of the STA 1010 by the PCR 1046 (or the WUR circuitry 1054) of the STA 1030. The MAC layer logic circuitry of the STA 1030 may generate a frame responsive to the WUR frame as an ACK frame to transmit to the STA 1010 and may pass the frame as an MAC protocol data unit (MPDU) to a PHY logic circuitry. The PHY logic circuitry may encode and transform the data into OFDM symbols for transmission to the STA 1010. The PHY logic circuitry may generate a preamble to prepend the PHY service data unit (PSDU) (the MPDU) to form a PHY protocol data unit (PPDU) for transmission (element 4310). In some embodiments, more than one MPDU may be included in a PPDU.

The physical layer device such as the transmitter 3006 in FIG. 3 or the wireless network interfaces 1022 and 1052 in FIG. 1A may convert the PPDU to a communication signal (element 4315). The transmitter may then transmit the communication signal via the antenna (element 4320).

Referring to FIG. 4E, the flowchart 4400 begins with a receiver of a device such as the receiver 3004 in FIG. 3 receiving a communication signal via one or more antenna (s) such as an antenna element of antenna array 3018 (element 4410). The receiver may convert the communication signal into an MPDU in accordance with the process described in the preamble (element 4415). More specifically, the received signal is fed from the one or more antennas to a DBF such as the DBF 220. The DBF transforms the antenna signals into information signals. The output of the DBF is fed to OFDM such as the OFDM 3022 in FIG. 3. The OFDM extracts signal information from the plurality of subcarriers onto which information-bearing signals are modulated. Then, the demodulator such as the demodulator 3024 demodulates the signal information via, e.g., BPSK, 16-QAM (quadrature amplitude modulation), 64-QAM, 256-QAM, quadrature phase shift keying (QPSK), or staggered quadrature phase shift keying (SQPSK). And the decoder such as the decoder 3026 decodes the signal information from the demodulator via, e.g., BCC or LDPC, to extract the MPDU and pass or communicate the MPDU to MAC layer logic such as MAC logic circuitry 3001 (element 4420).

The MAC logic circuitry may determine frame field values from the MPDU (element 4425) such as the management frame fields in the management frame 2400 shown in FIG. 2F. For instance, the MAC logic circuitry may determine frame field values such as the type and subtype field values of the synch frame. The MAC sublayer logic may determine that the MPDU comprises a WUR beacon frame so the MAC logic circuitry may generate a response frame.

Referring to FIG. 4F, the flowchart 4500 begins with a WUR of a station such as the WUR logic circuitry 1020 and/or WUR circuitry 1024 of the STA 1010 in FIG. 1A determining a MAC frame to transmit a wake-up packet (WUP) to a WURx of a station such as the STA 1030 in FIG. 1A (element 4502) in a WUR PPDU such as the WUR PPDU discussed in conjunction with the flowchart 4500. The WUR may generate the MAC frame as a WUP in a WURx mode as a WURx operation. For example, the WUR may generate a WUP to instruct a WURx to wake the PCR associated with the WURx.

After generation of the MAC frame, the WUR may pass the MAC frame to the PHY to generate OOK OFDM symbols for transmission in the OFDMA packet on a subband of the channel (element 4504) with 2-microsecond pulses and a preamble to indicate a high data rate (HDR) transmission for the MAC frame. For example, the PHY may cause the WUR preamble to signal the HDR and the MAC frame to transmit via a radio and antenna array on a center sub-band of a 20 MHz channel at the HDR of 250 kbps.

FIG. 5 shows a functional diagram of an exemplary communication station 500 in accordance with some embodiments. In one embodiment, FIG. 5 illustrates a functional block diagram of a communication station that may be suitable for use as an AP such as the station 1010 shown in FIG. 1A or the station 1030 shown in FIG. 1A in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The transceiver 510 may be a device comprising both a transmitter and a receiver that are combined and share common circuitry (e.g., communication circuitry 502). The communication circuitry 502 may include amplifiers, filters, mixers, analog to digital and/or digital to analog converters. The transceiver 510 may transmit and receive analog or digital signals. The transceiver 510 may allow reception of signals during transmission periods. This mode is known as full-duplex, and may require the transmitter and receiver to operate on different frequencies to minimize interference between the transmitted signal and the received signal. The transceiver 510 may operate in a half-duplex mode, where the transceiver 510 may transmit or receive signals in one direction at a time.

The communications circuitry 502 may include circuitry that can operate the physical layer (PHY) communications and/or media access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in detailed in FIGS. 1-4.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a WUR 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The WUR 619 may carry out or perform any of the operations and processes (e.g., flowcharts 4000, 4100, 4250, 4300, 4400, and 4500) described and shown above.

It is understood that the above are only a subset of what the WUR 619 may be configured to perform and that other functions included throughout this disclosure may also be performed by the WUR 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Figure 7:
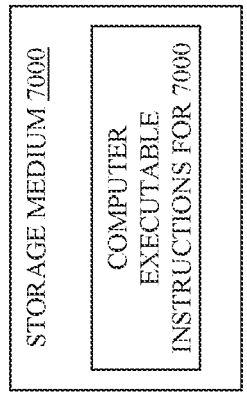
FIGS. 7-8 included herein to depict a computer-readable storage medium and a computing platform to support compatible low rate for wake-up radio packet transmission.

FIG. 7 illustrates an example of a storage medium 7000 to store pre-population logic such as one or more pre-population executables. Storage medium 7000 may comprise an article of manufacture. In some examples, storage medium 7000 may include any non-transitory computer readable medium or machine-readable medium, such as an optical, magnetic or semiconductor storage. Storage medium 7000 may store diverse types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

Figure 8:
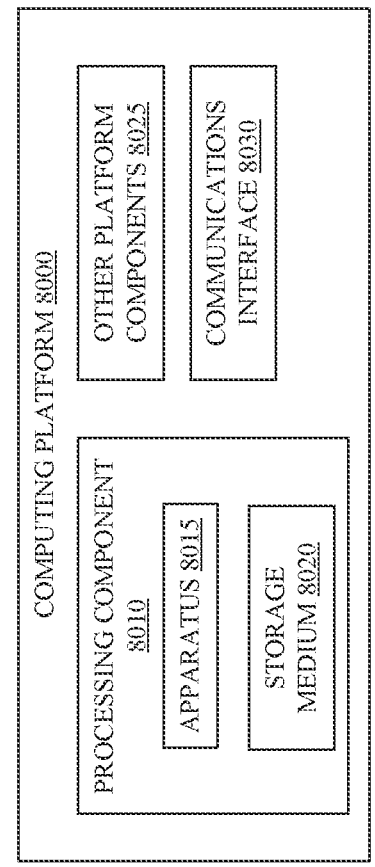

FIG. 8 illustrates an example computing platform 8000 such as the STAs 1010, 1030, 1090, 1092, 1094, 1096, and 1098 in FIG. 1A. In some examples, as shown in FIG. 8, computing platform 8000 may include a processing component 8010, other platform components or a communications interface 8030 such as the wireless network interfaces 1022 and 1052 shown in FIG. 1A. According to some examples, computing platform 8000 may be a computing device such as a server in a system such as a data center or server farm that supports a manager or controller for managing configurable computing resources as mentioned above. Furthermore, the communications interface 8030 may comprise a wake-up radio (WUR) and may be capable of waking up a primary connectivity radio (PCR) of the computing platform 8000.

According to some examples, processing component 8010 may execute processing operations or logic for apparatus 8015 described herein. Processing component 8010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits (ICs), application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 8020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. While discussions herein describe elements of embodiments as software elements and/or hardware elements, decisions to implement an embodiment using hardware elements and/or software elements may vary in accordance with any number of design considerations or factors, such as desired computational rate, power levels, heat tolerances, processing cycle budget, input data rates, output data rates, memory resources, data bus speeds and other design or performance constraints.

In some examples, other platform components 8025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., universal serial bus (USB) memory), solid state drives (SSD) and any other type of storage media suitable for storing information.

In some examples, communications interface 8030 may include logic and/or features to support a communication interface. For these examples, communications interface 8030 may include one or more communication interfaces that operate according to various communication protocols or standards to communicate over direct or network communication links. Direct communications may occur via use of communication protocols or standards described in one or more industry standards (including progenies and variants) such as those associated with the Peripheral Component Interconnect (PCI) Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 8000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, various embodiments of the computing platform 8000 may include or exclude functions and/or specific configurations of the computing platform 8000 described herein.

The components and features of computing platform 8000 may comprise any combination of discrete circuitry, ASICs, logic gates and/or single chip architectures. Further, the features of computing platform 8000 may comprise microcontrollers, programmable logic arrays and/or microprocessors or any combination of the foregoing where suitably appropriate. Note that hardware, firmware and/or software elements may be collectively or individually referred to herein as "logic".

One or more aspects of at least one example may comprise representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Several embodiments have one or more potentially advantages effects. For instance, generating a signal with OFDM pulses to transmit a wake-up radio packet, advantageously facilitates a low power, low cost wake-up radio and wake-up radio packet transmissions as part of OFDMA transmissions to increase spectral utilization. Generating a OFDM symbols of an IEEE 802.11 preamble on a channel followed by pulses of OFDM symbols of the wake-up radio packet on a sub-band of the channel advantageously facilitates a low power, low cost wake-up radio and wake-up radio packet transmissions as part of OFDMA transmissions to increase spectral utilization. Generating or decoding the WUR packet with a 4 megahertz (MHz) bandwidth advantageously facilitates a low power, low cost wake-up radio and wake-up radio packet transmissions as part of OFDMA transmissions to increase spectral utilization. Generating or decoding different preambles advantageously facilitates a low power, low cost wake-up radio and wake-up radio packet transmissions as part of OFDMA transmissions to increase spectral utilization. Generating or decoding different preambles to determine different data rates for transmission of a MAC frame advantageously facilitates a low power, low cost wake-up radio and wake-up radio packet transmissions as part of OFDMA transmissions to increase spectral utilization. Generating or decoding the WUR packet with a high data rate (HDR) preamble followed by a medium access control (MAC) frame, the HDR preamble to indicate a rate of transmission of the MAC frame, advantageously facilitates a low power, low cost wake-up radio and wake-up radio packet transmissions as part of OFDMA transmissions to increase spectral utilization. Generating or decoding the WUR packet with the HDR preamble comprising 32 bits to transmit using 2 microsecond pulses of OFDM symbols, advantageously facilitates a low power, low cost wake-up radio and wake-up radio packet transmissions as part of OFDMA transmissions to increase spectral utilization. Generating or decoding the WUR packet with a high data rate (HDR) preamble comprising 32 bits to transmit with 2 microsecond pulses of OFDM symbols to signal a data rate of 250 kilobits per second, advantageously facilitates a low power, low cost wake-up radio and wake-up radio packet transmissions as part of OFDMA transmissions to increase spectral utilization. Generating or decoding the WUR packet with a low data rate (LDR) preamble followed by a medium access control (MAC) frame, the LDR preamble to indicate a rate of transmission of MAC frame, advantageously facilitates a low power, low cost wake-up radio and wake-up radio packet transmissions as part of OFDMA transmissions to increase spectral utilization. Generating or decoding the WUR packet with a low data rate (LDR) preamble to signal a rate of transmission of MAC frame of 62.5 kilobits per second advantageously facilitates a low power, low cost wake-up radio and wake-up radio packet transmissions as part of OFDMA transmissions to increase spectral utilization. Generating or decoding the LDR preamble comprising a bit count that is twice a bit count of the HDR preamble advantageously facilitates a low power, low cost wake-up radio and wake-up radio packet transmissions as part of OFDMA transmissions to increase spectral utilization. Generating or decoding the LDR preamble with a duration of 128 microseconds advantageously facilitates a low power, low cost wake-up radio and wake-up radio packet transmissions as part of OFDMA transmissions to increase spectral utilization. Generating or decoding a MAC frame with 4 microsecond pulses of OFDM symbols after transmission of the LDR preamble advantageously facilitates a low power, low cost wake-up radio and wake-up radio packet transmissions as part of OFDMA transmissions to increase spectral utilization.

EXAMPLES OF FURTHER EMBODIMENTS

The following examples pertain to further embodiments. Specifics in the examples may be used anywhere in one or more embodiments.

Example 1 is an apparatus to communicate a wake-up radio (WUR) packet, the apparatus comprising: a memory; and logic circuitry coupled with the memory to generate the WUR packet with a 4 megahertz (MHz) bandwidth, wherein the WUR packet comprises a high data rate (HDR) preamble followed by a medium access control (MAC) frame, the HDR preamble to indicate a rate of transmission of the MAC frame, the HDR preamble comprising 32 bits to transmit using 2 microsecond pulses of orthogonal frequency-division multiplexing (OFDM) symbols to signal a data rate of 250 kilobits per second. In Example 2, the apparatus of Example 1, further comprising a processor, the memory coupled with the processor, a radio coupled with a physical layer device, and one or more antennas coupled with the radio to transmit the WUR packet. In Example 3, the apparatus of Example 1, the HDR preamble to transmit with a duration of 64 microseconds. In Example 4, the apparatus of Example 1, the logic circuitry to generate a second WUR packet with a 4 megahertz (MHz) bandwidth, wherein the second WUR packet comprises a low data rate (LDR) preamble followed by a second MAC frame. In Example 5, the apparatus of Example 4, wherein the LDR preamble to signal a rate of transmission of the second MAC frame of 62.5 kilobits per second. In Example 6, the apparatus of Example 4, the LDR preamble comprising a bit count that is twice a bit count of the HDR preamble. In Example 7, the apparatus of Example 4, the LDR preamble to transmit with a duration of 128 microseconds. In Example 8, the apparatus of Example 4, the logic circuitry, after transmission of the LDR preamble, to send the second MAC frame using 4 microsecond pulses of OFDM symbols. In another Example, the apparatus of Example 1, the logic circuitry to transmit using a 2 microsecond pulse by masking half of a time domain signal of a 4 microsecond pulse of an OFDM symbol.

Example 9 is a non-transitory computer-readable medium, comprising instructions to communicate a wake-up radio packet, which when executed by a processor, cause the processor to perform operations to: generate, by a logic circuitry of a wake-up radio (WUR) of a first device, the WUR packet with a 4 megahertz (MHz) bandwidth, wherein the WUR packet comprises a high data rate (HDR) preamble followed by a medium access control (MAC) frame, the HDR preamble to indicate a rate of transmission of the MAC frame, the HDR preamble comprising 32 bits to transmit using 2 microsecond pulses of orthogonal frequency-division multiplexing (OFDM) symbols to signal a data rate of 250 kilobits per second; and cause transmission of the WUR packet. In Example 10, the non-transitory computer-readable medium of Example 9, the HDR preamble to transmit with a duration of 64 microseconds. In Example 11, the non-transitory computer-readable medium of Example 9, the logic circuitry to generate a second WUR packet with a 4 megahertz (MHz) bandwidth, wherein the second WUR packet comprises a low data rate (LDR) preamble followed by a second MAC frame. In Example 12, the non-transitory computer-readable medium of Example 11, wherein the LDR preamble to signal a rate of transmission of the second MAC frame of 62.5 kilobits per second. In Example 13, the non-transitory computer-readable medium of Example 11, the LDR preamble comprising a bit count that is twice a bit count of the HDR preamble. In Example 14, the non-transitory computer-readable medium of Example 11, the LDR preamble to transmit with a duration of 128 microseconds. In Example 15, the non-transitory computer-readable medium of Example 11, the logic circuitry, after transmission of the LDR preamble, to send the second MAC frame using 4 microsecond pulses of OFDM symbols.

Example 12 is a method to communicate a wake-up radio packet, the method comprising: generating, by a logic circuitry of a wake-up radio (WUR) of a first device, the WUR packet with a 4 megahertz (MHz) bandwidth, wherein the WUR packet comprises a high data rate (HDR) preamble followed by a medium access control (MAC) frame, the HDR preamble to indicate a rate of transmission of the MAC frame, the HDR preamble comprising 32 bits to transmit using 2 microsecond pulses of orthogonal frequency-division multiplexing (OFDM) symbols to signal a data rate of 250 kilobits per second; and cause transmission of the WUR packet. In Example 13, the method of Example 12, the HDR preamble to transmit with a duration of 64 microseconds. In Example 14, the method of Example 12, the logic circuitry to generate a second WUR packet with a 4 megahertz (MHz) bandwidth, wherein the second WUR packet comprises a low data rate (LDR) preamble followed by a second MAC frame. In Example 15, the method of Example 14, wherein the LDR preamble to signal a rate of transmission of the second MAC frame of 62.5 kilobits per second. In Example 16, the method of Example 14, the LDR preamble comprising a bit count that is twice a bit count of the HDR preamble. In Example 17, the method of Example 14, the LDR preamble to transmit with a duration of 128 microseconds. In Example 18, the method of Example 14, the logic circuitry, after transmission of the LDR preamble, to send the second MAC frame using 4 microsecond pulses of OFDM symbols.

Example 19 is a system to communicate a wake-up radio packet, the apparatus comprising: one or more antennas; a radio coupled with the one or more antennas; a memory; a baseband processor coupled with the memory to generate a medium access control (MAC) frame; and logic circuitry to generate the WUR packet with a 4 megahertz (MHz) bandwidth, wherein the WUR packet comprises a high data rate (HDR) preamble followed by a medium access control (MAC) frame, the HDR preamble to indicate a rate of transmission of the MAC frame, the HDR preamble comprising 32 bits to transmit using 2 microsecond pulses of orthogonal frequency-division multiplexing (OFDM) symbols to signal a data rate of 250 kilobits per second. In Example 20, the system of Example 19, the HDR preamble to transmit with a duration of 64 microseconds. In Example 21, the system of Example 19, wherein the rate of transmission of one OOK OFDM symbol of the MAC frame of the WUR packet is set to the rate of transmission of 62.5 kilobits per second for the low data rate. In Example 22, the system of Example 19, the logic circuitry to generate a second WUR packet with a 4 megahertz (MHz) bandwidth, wherein the second WUR packet comprises a low data rate (LDR) preamble followed by a second MAC frame. In Example 23, the system of Example 21, wherein the LDR preamble to signal a rate of transmission of the second MAC frame of 62.5 kilobits per second. In Example 24, the system of Example 21, the LDR preamble comprising a bit count that is twice a bit count of the HDR preamble. In Example 25, the system of Example 21, the LDR preamble to transmit with a duration of 128 microseconds. In Example 26, the system of Example 21, the logic circuitry, after transmission of the LDR preamble, to send the second MAC frame using 4 microsecond pulses of OFDM symbols.

Example 27 is an apparatus to communicate a wake-up radio packet, the apparatus comprising: a means for generating the WUR packet with a 4 megahertz (MHz) bandwidth, wherein the WUR packet comprises a high data rate (HDR) preamble followed by a medium access control (MAC) frame, the HDR preamble to indicate a rate of transmission of the MAC frame, the HDR preamble comprising 32 bits to transmit using 2 microsecond pulses of orthogonal frequency-division multiplexing (OFDM) symbols to signal a data rate of 250 kilobits per second; and a means for causing transmission of the WUR packet. In Example 28, the apparatus of Example 27, the HDR preamble to transmit with a duration of 64 microseconds. In Example 29, the apparatus of Example 27, further comprising a means for generating a second WUR packet with a 4 megahertz (MHz) bandwidth, wherein the second WUR packet comprises a low data rate (LDR) preamble followed by a second MAC frame. In Example 30, the apparatus of Example 29, wherein the LDR preamble to signal a rate of transmission of the second MAC frame of 62.5 kilobits per second. In Example 31, the apparatus of Example 29, the LDR preamble comprising a bit count that is twice a bit count of the HDR preamble. In Example 32, the apparatus of Example 29, the LDR preamble to transmit with a duration of 128 microseconds. In Example 33, the apparatus of Example 29, further comprising a means for, after transmission of the LDR preamble, sending a MAC frame with 4 microsecond pulses of OFDM symbols.

Example 34 is an apparatus to communicate a wake-up radio (WUR) packet, the apparatus comprising: memory; and a logic circuitry to decode the WUR packet with a 4 megahertz (MHz) bandwidth, wherein the WUR packet comprises a high data rate (HDR) preamble followed by a medium access control (MAC) frame, the HDR preamble to indicate a rate of transmission of the MAC frame, the HDR preamble comprising 32 bits to transmit using 2 microsecond pulses of orthogonal frequency-division multiplexing (OFDM) symbols to signal a data rate of 250 kilobits per second. In Example 35, the apparatus of Example 34, further comprising a processor, the memory coupled with the processor, a radio coupled with a physical layer device, and one or more antennas coupled with the radio to receive the WUR packet. In Example 36, the apparatus of Example 34, the HDR preamble to transmit with a duration of 64 microseconds. In Example 37, the apparatus of Example 34, the logic circuitry to decode a second WUR packet with a 4 megahertz (MHz) bandwidth, wherein the second WUR packet comprises a low data rate (LDR) preamble followed by a second MAC frame. In Example 38, the apparatus of Example 37, wherein the LDR preamble to signal a rate of transmission of the second MAC frame of 62.5 kilobits per second. In Example 39, the apparatus of Example 37, the LDR preamble comprising a bit count that is twice a bit count of the HDR preamble. In Example 40, the apparatus of Example 37, the LDR preamble to transmit with a duration of 128 microseconds. In Example 41, the apparatus of Example 37, the logic circuitry to transmit to transmit with 4 microsecond pulses of OFDM symbols.

Example 42 is a non-transitory computer-readable medium, comprising instructions to communicate a wake-up radio packet, which when executed by a processor, cause the processor to perform operations to: decode, by a logic circuitry, a wake-up radio (WUR) packet with a 4 megahertz (MHz) bandwidth, wherein the WUR packet comprises a high data rate (HDR) preamble followed by a medium access control (MAC) frame, the HDR preamble to indicate a rate of transmission of the MAC frame, the HDR preamble comprising 32 bits to transmit using 2 microsecond pulses of orthogonal frequency-division multiplexing (OFDM) symbols to signal a data rate of 250 kilobits per second; and pass the MAC frame to a MAC logic circuitry. In Example 43, the non-transitory computer-readable medium of Example 42, the HDR preamble to transmit with a duration of 64 microseconds. In Example 44, the non-transitory computer-readable medium of Example 42, the logic circuitry to decode a second WUR packet with a 4 megahertz (MHz) bandwidth, wherein the second WUR packet comprises a low data rate (LDR) preamble followed by a second MAC frame. In Example 45, the non-transitory computer-readable medium of Example 44, wherein the LDR preamble to signal a rate of transmission of the second MAC frame of 62.5 kilobits per second. In Example 46, the non-transitory computer-readable medium of Example 44, the LDR preamble comprising a bit count that is twice a bit count of the HDR preamble. In Example 47, the non-transitory computer-readable medium of Example 44, the LDR preamble to transmit with a duration of 128 microseconds. In Example 48, the non-transitory computer-readable medium of Example 44, the logic circuitry to transmit to transmit with 4 microsecond pulses of OFDM symbols.

Example 49 is a method to communicate a wake-up radio packet, the method comprising: decoding, by a physical layer device, a wake-up radio (WUR) packet with a 4 megahertz (MHz) bandwidth, wherein the WUR packet comprises a high data rate (HDR) preamble followed by a medium access control (MAC) frame, the HDR preamble to indicate a rate of transmission of the MAC frame, the HDR preamble comprising 32 bits to transmit using 2 microsecond pulses of orthogonal frequency-division multiplexing (OFDM) symbols to signal a data rate of 250 kilobits per second; and passing the MAC frame to a MAC logic circuitry. In Example 50, the method of Example 49, the HDR preamble to transmit with a duration of 64 microseconds. In Example 51, the method of Example 49, the logic circuitry to decode a second WUR packet with a 4 megahertz (MHz) bandwidth, wherein the second WUR packet comprises a low data rate (LDR) preamble followed by a second MAC frame. In Example 52, the method of Example 51, wherein the LDR preamble to signal a rate of transmission of the second MAC frame of 62.5 kilobits per second. In Example 53, the method of Example 51, the LDR preamble comprising a bit count that is twice a bit count of the HDR preamble. In Example 54, the method of Example 51, the LDR preamble to transmit with a duration of 128 microseconds. In Example 55, the method of Example 51, the logic circuitry, after transmission of the LDR preamble, to send the second MAC frame using 4 microsecond pulses of OFDM symbols.

Example 56 is a system to communicate a wake-up radio packet, the apparatus comprising: one or more antennas; a radio coupled with the one or more antennas; a logic circuitry to decode the WUR packet with a 4 megahertz (MHz) bandwidth, wherein the WUR packet comprises a high data rate (HDR) preamble followed by a medium access control (MAC) frame, the HDR preamble to indicate a rate of transmission of the MAC frame, the HDR preamble comprising 32 bits to transmit using 2 microsecond pulses of orthogonal frequency-division multiplexing (OFDM) symbols to signal a data rate of 250 kilobits per second; and a baseband processor coupled with the physical layer device parse the MAC frame to interpret the MAC frame. In Example 57, the system of Example 56, the HDR preamble to transmit with a duration of 64 microseconds. In Example 58, the system of Example 56, the logic circuitry to decode a second WUR packet with a 4 megahertz (MHz) bandwidth, wherein the second WUR packet comprises a low data rate (LDR) preamble followed by a second MAC frame. In Example 59, the system of Example 58, wherein the LDR preamble to signal a rate of transmission of the second MAC frame of 62.5 kilobits per second. In Example 60, the system of Example 58, the LDR preamble comprising a bit count that is twice a bit count of the HDR preamble. In Example 61, the system of Example 58, the LDR preamble to transmit with a duration of 128 microseconds. In Example 62, the system of Example 58, the logic circuitry, after transmission of the LDR preamble, to send the second MAC frame using 4 microsecond pulses of OFDM symbols.

Example 63 is an apparatus to communicate a wake-up radio packet, the apparatus comprising: a means for decoding a wake-up radio (WUR) packet with a 4 megahertz (MHz) bandwidth, wherein the WUR packet comprises a high data rate (HDR) preamble followed by a medium access control (MAC) frame, the HDR preamble to indicate a rate of transmission of the MAC frame, the HDR preamble comprising 32 bits to transmit using 2 microsecond pulses of orthogonal frequency-division multiplexing (OFDM) symbols to signal a data rate of 250 kilobits per second; and a means for passing the MAC frame to the MAC logic circuitry. In Example 64, the apparatus of Example 63, the HDR preamble to transmit with a duration of 64 microseconds. In Example 65, the apparatus of Example 63, the logic circuitry to decode a second WUR packet with a 4 megahertz (MHz) bandwidth, wherein the second WUR packet comprises a low data rate (LDR) preamble followed by a second MAC frame. In Example 66, the apparatus of Example 65, wherein the LDR preamble to signal a rate of transmission of the second MAC frame of 62.5 kilobits per second. In Example 67, the apparatus of Example 65, the LDR preamble comprising a bit count that is twice a bit count of the HDR preamble. In Example 68, the apparatus of Example 65, the LDR preamble to transmit with a duration of 128 microseconds. In Example 69, the apparatus of Example 65, the logic circuitry, after transmission of the LDR preamble, to send the second MAC frame using 4 microsecond pulses of OFDM symbols.

Example 70 is an apparatus to communicate a wake-up radio (WUR) packet, the apparatus comprising: memory; and a logic circuitry to decode the WUR packet with a 4 megahertz (MHz) bandwidth, wherein the WUR packet comprises a low data rate (LDR) preamble followed by a medium access control (MAC) frame, the LDR preamble to indicate a rate of transmission of MAC frame, the LDR preamble to transmit with 2 microsecond pulses of orthogonal frequency-division multiplexing (OFDM) symbols to signal 62.5 kilobits per second. In Example 71, the apparatus of Example 70, further comprising a processor, the memory coupled with the processor, a radio coupled with a physical layer device, and one or more antennas coupled with the radio to receive the WUR packet. In Example 72, the apparatus of Example 70, the LDR preamble to transmit with a duration of 128 microseconds. In Example 73, the apparatus of Example 70, the LDR preamble comprising a bit count that is half a bit count of a high data rate (HDR) preamble. In Example 74, the apparatus of Example 70, the logic circuitry to transmit to transmit with 4 microsecond pulses of OFDM symbols.

Example 75 is a non-transitory computer-readable medium, comprising instructions to communicate a wake-up radio packet, which when executed by a processor, cause the processor to perform operations to: decode, by a logic circuitry, a wake-up radio (WUR) packet with a 4 megahertz (MHz) bandwidth, wherein the WUR packet comprises a low data rate (LDR) preamble followed by a medium access control (MAC) frame, the LDR preamble to indicate a rate of transmission of MAC frame, the LDR preamble to transmit with 2 microsecond pulses of orthogonal frequency-division multiplexing (OFDM) symbols to signal 62.5 kilobits per second; and pass the MAC frame to a MAC logic circuitry. In Example 76, the non-transitory computer-readable medium of Example 75, the LDR preamble to transmit with a duration of 128 microseconds. In Example 77, the non-transitory computer-readable medium of Example 75, the logic circuitry to decode a second WUR packet with a 4 megahertz (MHz) bandwidth, wherein the second WUR packet comprises a low data rate (LDR) preamble followed by a second MAC frame. In Example 78, the non-transitory computer-readable medium of Example 75, wherein the LDR preamble to signal a rate of transmission of the second MAC frame of 62.5 kilobits per second. In Example 79, the non-transitory computer-readable medium of Example 75, the LDR preamble comprising a bit count that is half a bit count of a high data rate (HDR) preamble. In Example 80, the non-transitory computer-readable medium of Example 75, the logic circuitry to transmit to transmit with 4 microsecond pulses of OFDM symbols.

Example 81 is a method to communicate a wake-up radio packet, the method comprising: decoding, by a logic circuitry, a wake-up radio (WUR) packet with a 4 megahertz (MHz) bandwidth, wherein the WUR packet comprises a low data rate (LDR) preamble followed by a medium access control (MAC) frame, the LDR preamble to indicate a rate of transmission of MAC frame, the LDR preamble to transmit with 2 microsecond pulses of orthogonal frequency-division multiplexing (OFDM) symbols to signal 62.5 kilobits per second; and passing the MAC frame to a MAC logic circuitry. In Example 82, the method of Example 81, the LDR preamble to transmit with a duration of 128 microseconds. In Example 83, the method of Example 81, the logic circuitry to decode a second WUR packet with a 4 megahertz (MHz) bandwidth, wherein the second WUR packet comprises a low data rate (LDR) preamble followed by a second MAC frame. In Example 84, the method of Example 81, wherein the LDR preamble to signal a rate of transmission of the second MAC frame of 62.5 kilobits per second. In Example 85, the method of Example 81, the LDR preamble comprising a bit count that is half a bit count of a high data rate (HDR) preamble. In Example 86, the method of Example 81, the logic circuitry, after transmission of the LDR preamble, to send the second MAC frame using 4 microsecond pulses of OFDM symbols.

Example 87 is a system to communicate a wake-up radio packet, the apparatus comprising: one or more antennas; a radio coupled with the one or more antennas; a logic circuitry to decode the WUR packet with a 4 megahertz (MHz) bandwidth, wherein the WUR packet comprises a low data rate (LDR) preamble followed by a medium access control (MAC) frame, the LDR preamble to indicate a rate of transmission of MAC frame, the LDR preamble to transmit with 2 microsecond pulses of orthogonal frequency-division multiplexing (OFDM) symbols to signal 62.5 kilobits per second; and a baseband processor coupled with the physical layer device parse the MAC frame to interpret the MAC frame. In Example 88, the system of Example 87, further comprising a processor, the memory coupled with the processor, a radio coupled with a physical layer device, and one or more antennas coupled with the radio to receive the WUR packet. In Example 89, the system of Example 87, the LDR preamble to transmit with a duration of 128 microseconds. In Example 90, the system of Example 87, the LDR preamble comprising a bit count that is half a bit count of a high data rate (HDR) preamble. In Example 91, the system of Example 87, the logic circuitry, after transmission of the LDR preamble, to send the second MAC frame using 4 microsecond pulses of OFDM symbols.

Example 92 is an apparatus to communicate a wake-up radio packet, the apparatus comprising: a means for decoding a wake-up radio (WUR) packet, wherein the WUR packet comprises an on-off keying (OOK) signal, a preamble of the WUR packet to indicate a rate of transmission of one or more OOK orthogonal frequency-division multiplexing (OFDM) symbols of a medium access control (MAC) frame of the WUR packet, wherein the preamble comprises a first preamble to signal a high data rate or a second preamble to signal a low data rate, the first preamble and the second preamble to have different bit counts, wherein a length in bits of the second preamble is twice a length in bits of the first preamble; and a means for passing the MAC frame to the MAC logic circuitry. In Example 93, the apparatus of Example 92, the LDR preamble to transmit with a duration of 128 microseconds. In Example 94, the apparatus of Example 92, the logic circuitry to decode a second WUR packet with a 4 megahertz (MHz) bandwidth, wherein the second WUR packet comprises a low data rate (LDR) preamble followed by a second MAC frame. In Example 95, the apparatus of Example 92, wherein the LDR preamble to signal a rate of transmission of the second MAC frame of 62.5 kilobits per second. In Example 96, the apparatus of Example 92, the LDR preamble comprising a bit count that is half a bit count of a high data rate (HDR) preamble. In Example 97, the apparatus of Example 92, the logic circuitry, after transmission of the LDR preamble, to send the second MAC frame using 4 microsecond pulses of OFDM symbols.

What is claimed is:

1. An apparatus to communicate a wake-up radio (WUR) medium access control (MAC) frame, the apparatus comprising:
    a memory; and
    logic circuitry coupled with the memory to:
    generate a WUR physical layer protocol data unit (PPDU) comprising a legacy preamble followed by more than one binary phase-shift keying (BPSK) modulated orthogonal frequency-division multiplexing (OFDM) symbols, a WUR preamble, and WUR data, wherein the more than one BPSK symbols of the WUR PPDU are followed by the WUR preamble and the WUR data, wherein the WUR preamble comprises a high data rate (HDR) preamble, wherein the WUR data comprises the WUR MAC frame, the HDR preamble to indicate a rate of transmission of the WUR MAC frame, the HDR preamble comprising 32 bits for transmission via 2 microsecond pulses of OFDM symbols to signal a data rate of 250 kilobits per second, the WUR MAC frame comprising a MAC header and a payload, the payload comprising an action identifier and an action payload, the action identifier to identify a structure of the action payload; and
    cause transmission of the WUR PPDU with the WUR MAC frame.

2. The apparatus of claim 1, wherein the logic circuitry comprises a baseband processor coupled with the memory, and further comprising a radio coupled with the logic circuitry and one or more antennas coupled with the radio to transmit the WUR PPDU with the WUR MAC frame.

3. The apparatus of claim 1, wherein the WUR preamble and the WUR data are centered in a 20 MHz subchannel of a frequency division multiple access (FDMA) WUR PPDU.

4. The apparatus of claim 1, the logic circuitry to cause transmission of the WUR MAC frame via 2 microsecond pulses per OFDM symbol at the data rate of 250 kilobits per second, wherein a duration of the HDR preamble is 64 microseconds.

5. The apparatus of claim 1, the logic circuitry to generate a second WUR preamble and a second WUR MAC frame, wherein the second WUR preamble comprises a low data rate (LDR) preamble.

6. The apparatus of claim 5, the LDR preamble to signal a rate of transmission of the second WUR MAC frame of 62.5 kilobits per second.

7. The apparatus of claim 5, the LDR preamble comprising a bit count that is twice a bit count of the HDR preamble.

8. The apparatus of claim 5, wherein a duration of the LDR preamble is 128 microseconds.

9. The apparatus of claim 5, the logic circuitry, after causing transmission of the LDR preamble, to cause transmission of the second WUR MAC frame via 4 microsecond pulses of OFDM symbols.

10. A non-transitory computer-readable medium, comprising instructions to communicate a wake-up radio (WUR) medium access control (MAC) frame, which when executed by a processor, cause the processor to perform operations to:
generate a WUR physical layer protocol data unit (PPDU) comprising a legacy preamble followed by more than one binary phase-shift keying (BPSK) modulated orthogonal frequency-division multiplexing (OFDM) symbols, a WUR preamble, and WUR data, wherein the more than one BPSK symbols of the WUR PPDU are followed by the WUR preamble and the WUR data, wherein the WUR preamble comprises a high data rate (HDR) preamble and the WUR data comprises the WUR MAC frame, the HDR preamble to indicate a rate of transmission of the WUR MAC frame, the HDR preamble comprising 32 bits for transmission via 2 microsecond pulses of OFDM symbols to signal a data rate of 250 kilobits per second, the WUR MAC frame comprising a MAC header and a payload, the payload comprising an action identifier and an action payload, the action identifier to identify a structure of the action payload; and
cause transmission of the WUR PPDU with the WUR MAC frame.

11. The non-transitory computer-readable medium of claim 10, the operations to generate the HDR preamble for transmission with a duration of 64 microseconds.

12. The non-transitory computer-readable medium of claim 10, the operations to cause transmission of the WUR MAC frame via 2 microsecond pulses per OFDM symbol at the data rate of 250 kilobits per second.

13. The non-transitory computer-readable medium of claim 10, the operations to generate a second WUR preamble and a second WUR MAC frame, wherein the second WUR preamble comprises a low data rate (LDR) preamble.

14. The non-transitory computer-readable medium of claim 13, the LDR preamble comprising a bit count that is twice a bit count of the HDR preamble.

15. An apparatus to communicate a wake-up radio (WUR) medium access control (MAC) frame, the apparatus comprising:
memory; and
a logic circuitry coupled with the memory to:
receive the WUR MAC frame of a WUR physical layer protocol data unit (PPDU), the WUR PPDU comprising a legacy preamble followed by more than one binary phase-shift keying (BPSK) modulated orthogonal frequency-division multiplexing (OFDM) symbols, a WUR preamble, and the WUR MAC frame; and
decode the WUR preamble and the WUR MAC frame, wherein the WUR preamble comprises a high data rate (HDR) preamble, the HDR preamble to indicate a rate of transmission of the WUR MAC frame, the HDR preamble comprising 32 bits to transmit using 2 microsecond pulses of OFDM symbols to signal a data rate of 250 kilobits per second, the WUR MAC frame comprising a MAC header and a payload, the payload comprising an action identifier and an action payload, the action identifier to identify a structure of the action payload.

16. The apparatus of claim 15, wherein the logic circuitry comprises a baseband processor coupled with the memory, and further comprising a radio coupled with the logic circuitry and one or more antennas coupled with the radio to receive the WUR MAC frame.

17. The apparatus of claim 15, the HDR preamble having a duration of 64 microseconds and the WUR MAC frame having 2 microsecond pulses per OFDM symbol at the data rate of 250 kilobits per second.

18. The apparatus of claim 15, a low data rate (LDR) preamble comprising a bit count that is twice a bit count of the HDR preamble.

19. A non-transitory computer-readable medium, comprising instructions to communicate a wake-up radio (WUR) medium access control (MAC) frame, which when executed by a processor, cause the processor to perform operations to:
receive the WUR MAC frame of a WUR physical layer protocol data unit (PPDU), the WUR PPDU comprising a legacy preamble followed by more than one binary phase-shift keying (BPSK) modulated orthogonal frequency-division multiplexing (OFDM) symbols, a WUR preamble, and WUR data; and
decode the WUR preamble and the WUR data, wherein the WUR preamble comprises a high data rate (HDR) preamble and the WUR data comprises the WUR MAC frame, the HDR preamble to indicate a rate of transmission of the WUR MAC frame, the HDR preamble comprising 32 bits with 2 microsecond pulses of OFDM symbols to signal a data rate of 250 kilobits per second, the WUR MAC frame comprising a MAC header and a payload, the payload comprising an action identifier and an action payload, the action identifier to identify a structure of the action payload.

20. The non-transitory computer-readable medium of claim 19, the HDR preamble having a duration of 64 microseconds and the WUR MAC frame having 2 microsecond pulses per OFDM symbol at the data rate of 250 kilobits per second.

21. The non-transitory computer-readable medium of claim 19, a low data rate (LDR) preamble comprising a bit count that is twice a bit count of the HDR preamble.

* * * * *